United States Patent [19]

Lemelson

[11] 3,881,053

[45] Apr. 29, 1975

[54] SCANNING SYSTEM

[76] Inventor: Jerome H. Lemelson, 85 Rector St., Metuchen, N.J. 08840

[22] Filed: Oct. 10, 1972

[21] Appl. No.: 295,807

Related U.S. Application Data

[60] Continuation-in-part of Ser. No. 224,131, Feb. 7, 1972, which is a continuation-in-part of Ser. No. 142,748, Aug. 28, 1961, Pat. No. 3,646,258, which is a division of Ser. No. 515,417, June 14, 1955, Pat. No. 3,003,109.

[52] U.S. Cl. ..... 178/6.8; 178/DIG. 1; 178/DIG. 22; 178/DIG. 38

[51] Int. Cl. ..... H04n 7/18

[58] Field of Search ......... 178/DIG. 38, 6.8, DIG. 1, 178/DIG. 22, 7.2; 235/151.11

[56] References Cited

UNITED STATES PATENTS

| | | | |
|---|---|---|---|
| 1,867,542 | 7/1932 | Hammond | 178/6.6 A |
| 2,359,032 | 9/1944 | Gott | 178/DIG. 38 |
| 2,531,497 | 11/1950 | Beatty | 178/DIG. 1 |
| 2,892,526 | 6/1959 | Devaud | 235/151.11 |

*Primary Examiner*—Howard W. Britton

[57] ABSTRACT

An apparatus and method are provided for automatically positioning a scanning device such as a video camera at selected locations of a substantial area of operation to permit the scanning device to selectively scan different phenomena within the realm of the different areas which may be scanned thereby. In one form, the scanning device is supported by a carriage which is movable along a trackway and is automatically or remotely controlled in its operation. The scanning device is also movable on a fixture which is secured to the carriage so that it may be predeterminately located at different distances from the carriage to scan along different paths of locations.

The system includes one or more monitor stations containing receivers of the signals generated by the scanning device and respective viewing screens on which the scanned phenomenon may be displayed. Recording means is also provided which is selectively operably to permit the recording of signals of the scanned phenomena, which signals may be later monitored or analyzed. When it is desired to have a hard copy of the recorded information, a suitable camera or other form of reproduction means is provided which is operable to print copy by the person at the monitor station. In a particular form, the phenomena scanned comprise a plurality of record units or record tracks each containing plural recordings which may be separately and selectively scanned with the scanned information being remotely monitorable and recordable.

Control of the operation of the scanner and its conveyance is effected either by automatic means or by remotely generated control signals which are generated by an operator's selective operation of switches.

10 Claims, 37 Drawing Figures

SCANNING SYSTEM

RELATED APPLICATIONS

This is a continuation-in-part of application Ser. No. 224,131 filed Feb. 7, 1972 for Tape Cartridge and Transducing Means Therefore which was a continuation-in-part of Ser. No. 142,748 filed Aug. 28, 1961, now U.S. Pat. No. 3,646,258 which was a division of Ser. No. 515,417 filed June 14, 1955, now U.S. Pat. No. 3,003,109.

SUMMARY OF THE INVENTION

This invention relates to a remotely controllable scanning apparatus, particularly such an apparatus employing a television camera adapted to scan different areas adjacent or aligned with a trackway along which the camera may travel. The apparatus may be employed for information storage and retrieval, surveyllance and inspection and other purposes.

Prior to the making of the instant invention, it was known to control the attitude of a television motion picture camera on a fixed mount to permit the camera to rotate about an axis for scanning the area surrounding the mount. Such an apparatus is extremely limited in its applications and is utilized primarily for the production of motion pictures wherein camera movement is effected in direct response to the operation of one or more electric motors which are electrically controlled by an operator who is located immediately adjacent the camera and effects control thereof as he watches the camera move in response to his operation of the controls for the motors.

The instant invention employs a trackway of substantial length along which a carriage supporting a video scaner or TV camera on a mount wherein the camera may be further moved with respect to the carriage. Automatic remote control means is provided for selectively locating the carriage on the trackway and for selectively positioning the camera thereafter with respect to the carriage which control is programmed and initiated by the operator who need not devote additional time or effort in selectively positioning the camera after the initial programming operations. The camera may thus be dispatched to any location in its realm of movement and used to scan a phenomenon thereat or may be employed to scan as it travels along the trackway.

Accordingly it is a primary object of this invention to provide an apparatus and method for selectively scanning different phenomena with an automatic scanning device such as a video camera.

Another object is to provide a system for positioning and controlling the operation of a television camera which may be used to perform a variety of functions and useful operations.

Another object is to provide a new and improved remote control system for an electro-optical scanner such as a video camera with which it may be automatically positioned or directed to scan a selected area or areas in the realm of its movement.

Another object is to provide a television scanning apparatus including a televison camera with a motor operated device supported adjacent the camera which device may be remotely controlled in its operation together with the camera.

Another object is to provide a system for remotely controlling the positioning of a television camera so that it may be used to scan information recorded at different locations.

Another object is to provide a track travelling television camera and a control system for predeterminately locating the camera so that a single camera may be used to automatically scan a variety of different areas which a single camera would be incapable of scanning per se.

Figures 12, 13, 14, 15:
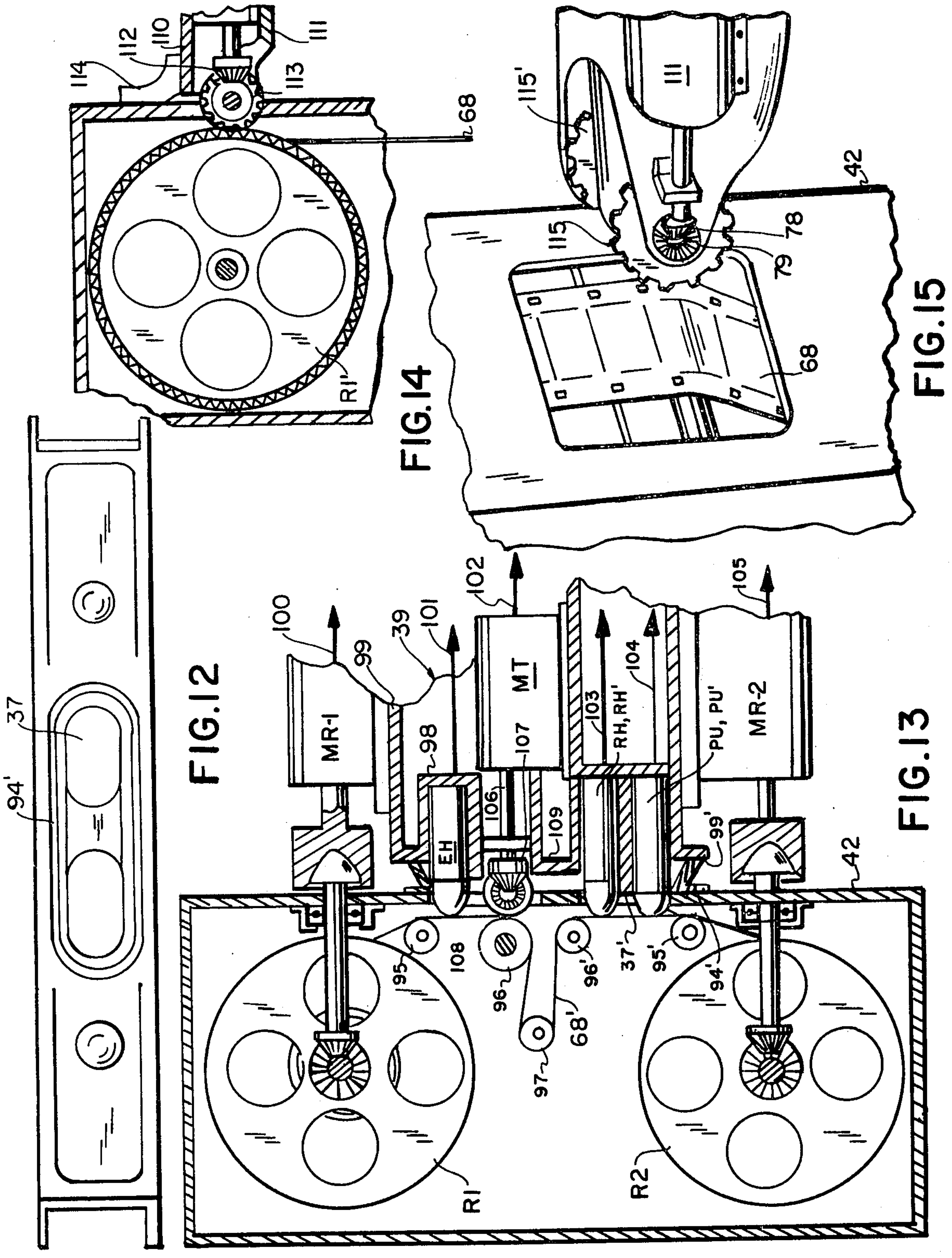
Figures 12A, 12B, 12C, 12D, 12E:
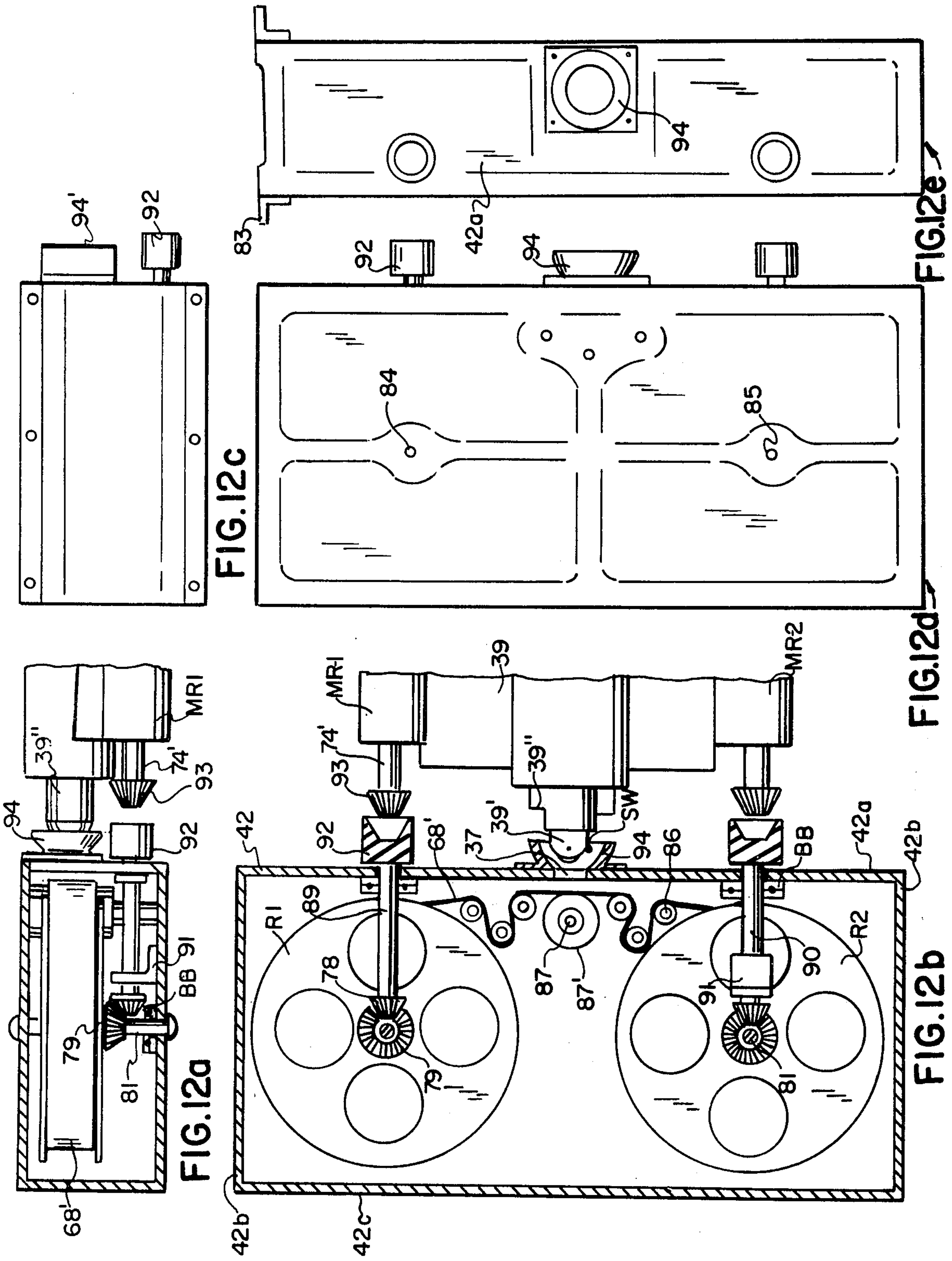

FIG. 12*a* is a top view with the top wall removed of a magnetic tape magazine and a scanning and driving means for the tape therein;

FIG. 12*b* is a side view with the side wall removed of the magazine and apparatus of FIG. 12*a;*

FIG. 12*c* is a top view of the magazine of FIG. 12*a;*

FIG. 12*d* is a side view of the magazine of FIG. 12*c;*

FIG. 12*e* is an end view of the magazine of FIG. 12*c;*

Figure 16:
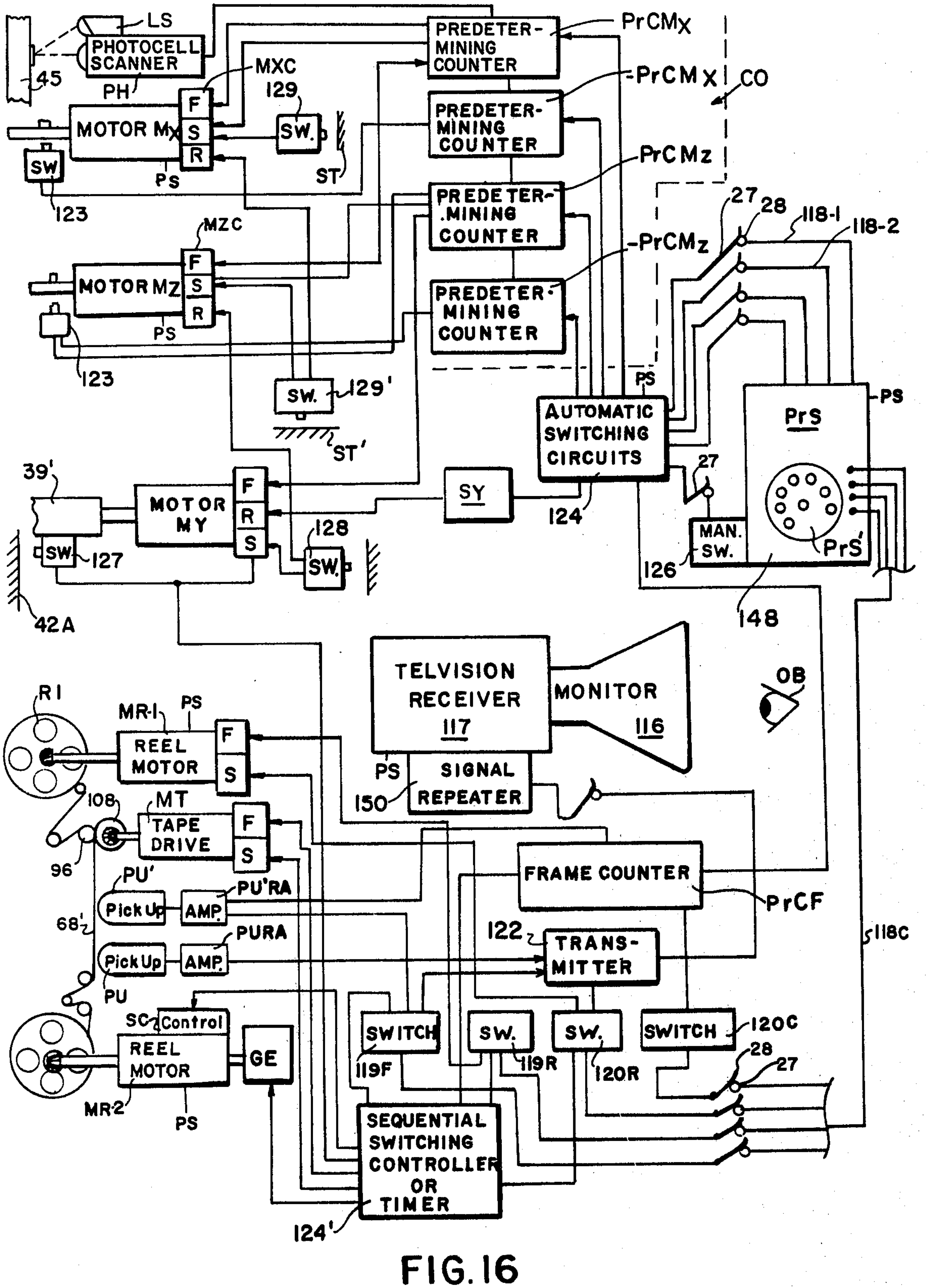
Figures 17, 19:
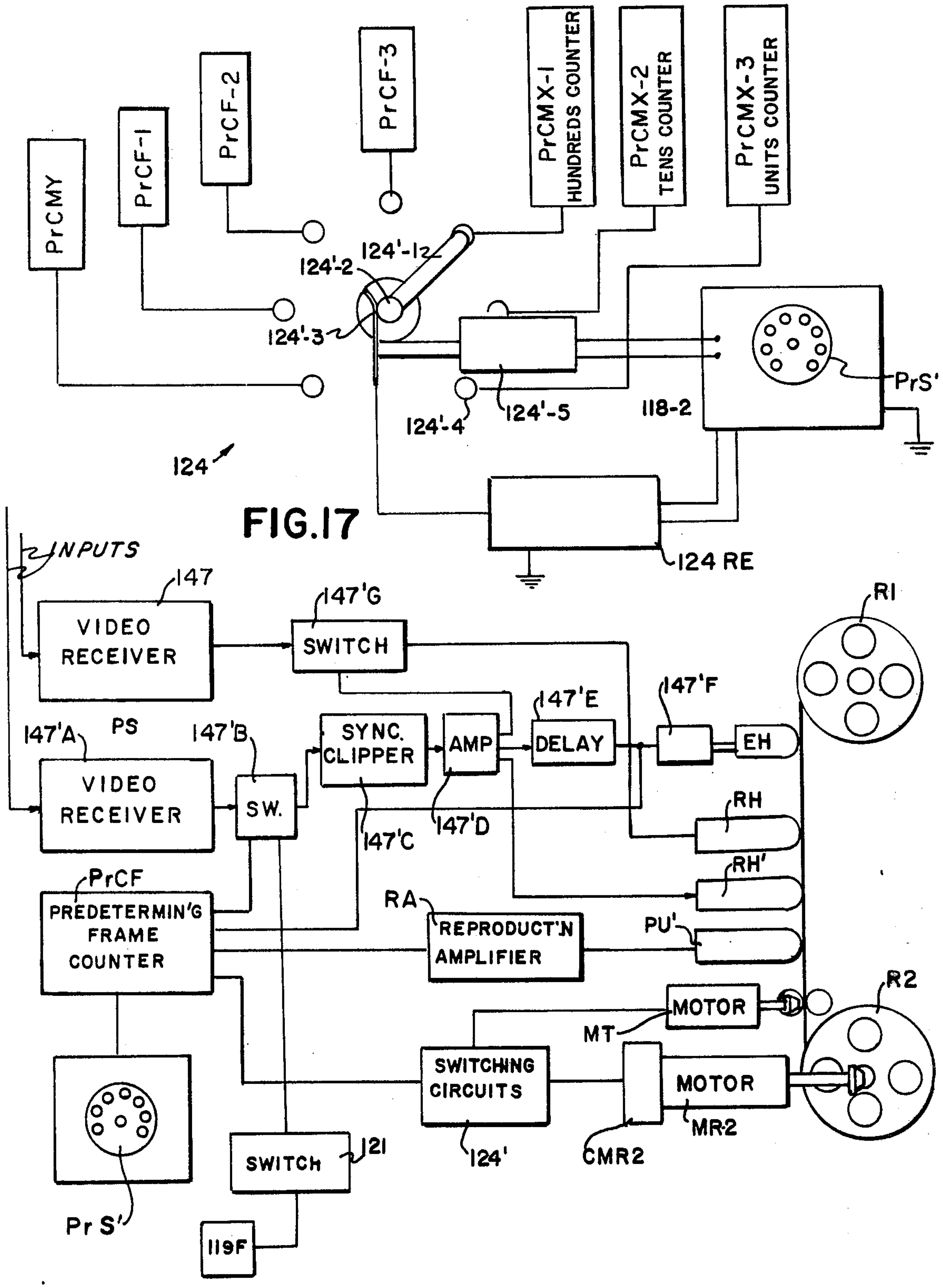
Figure 18:
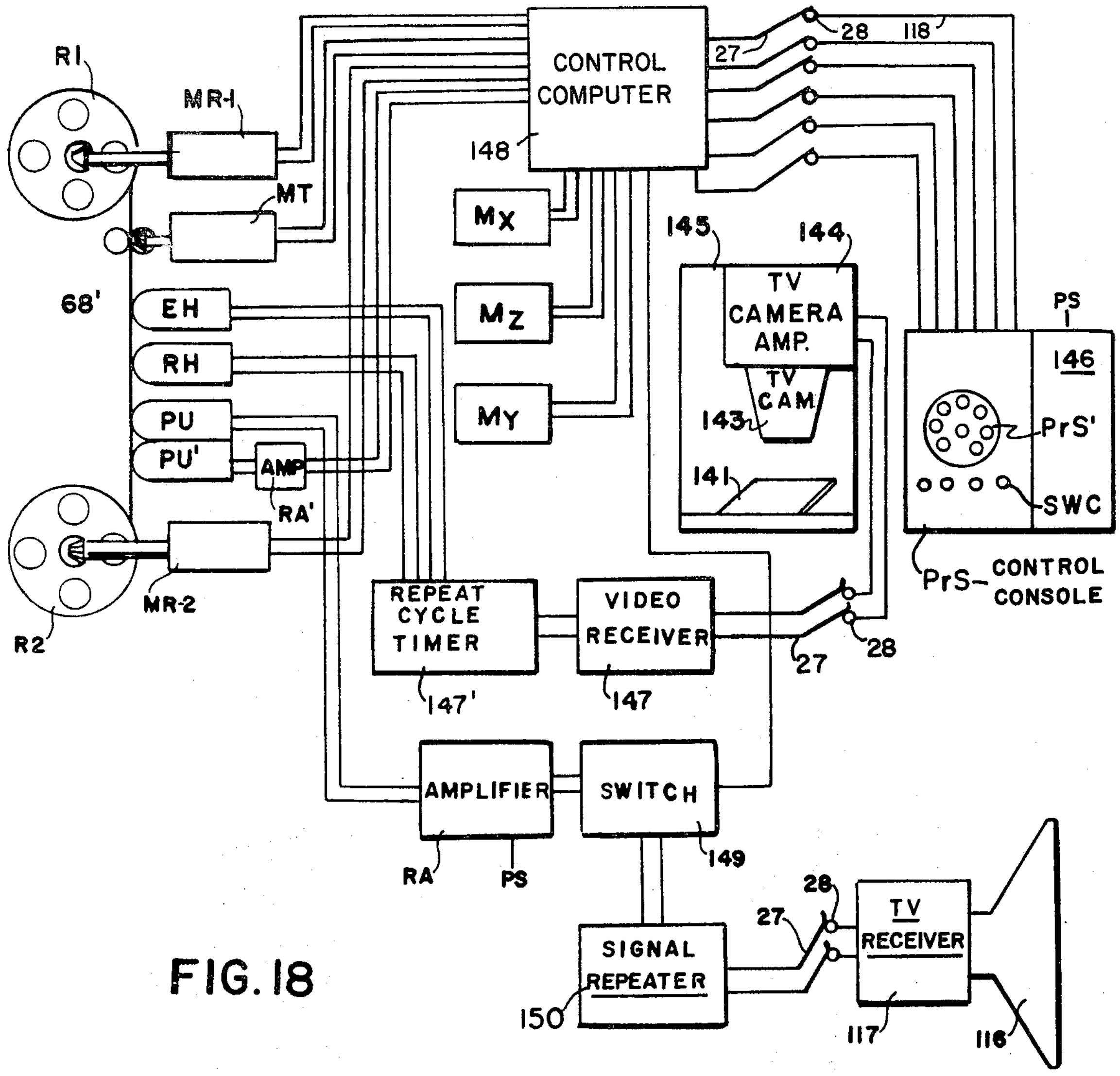
Figure 21:
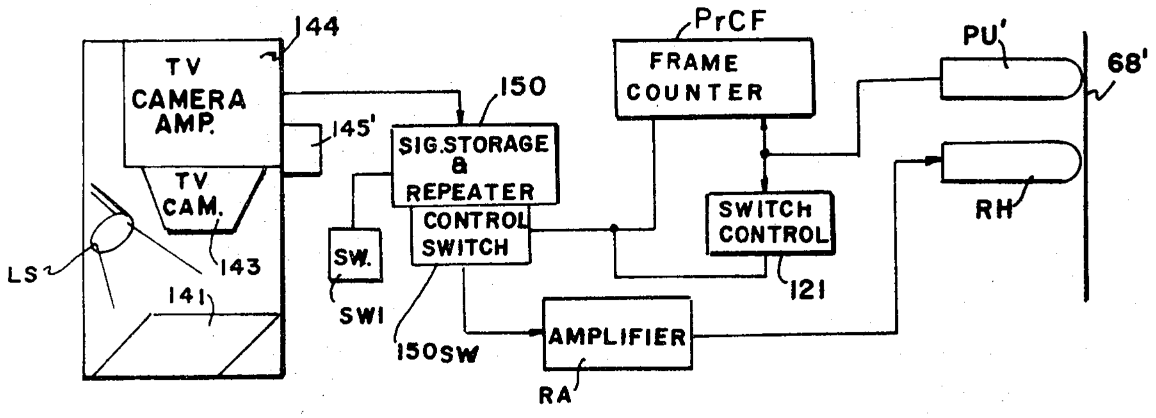
Figure 20:
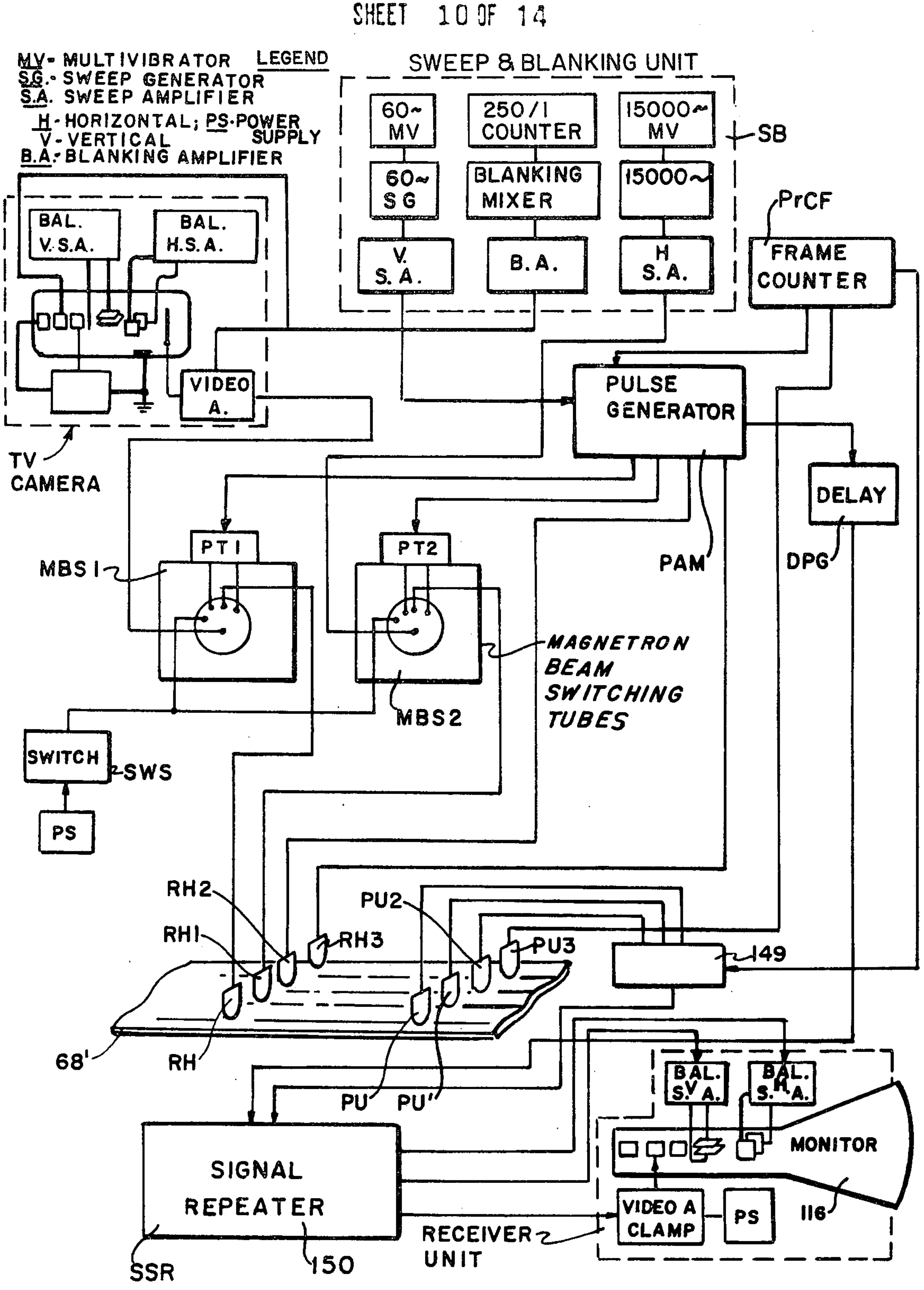
Figures 22, 23:
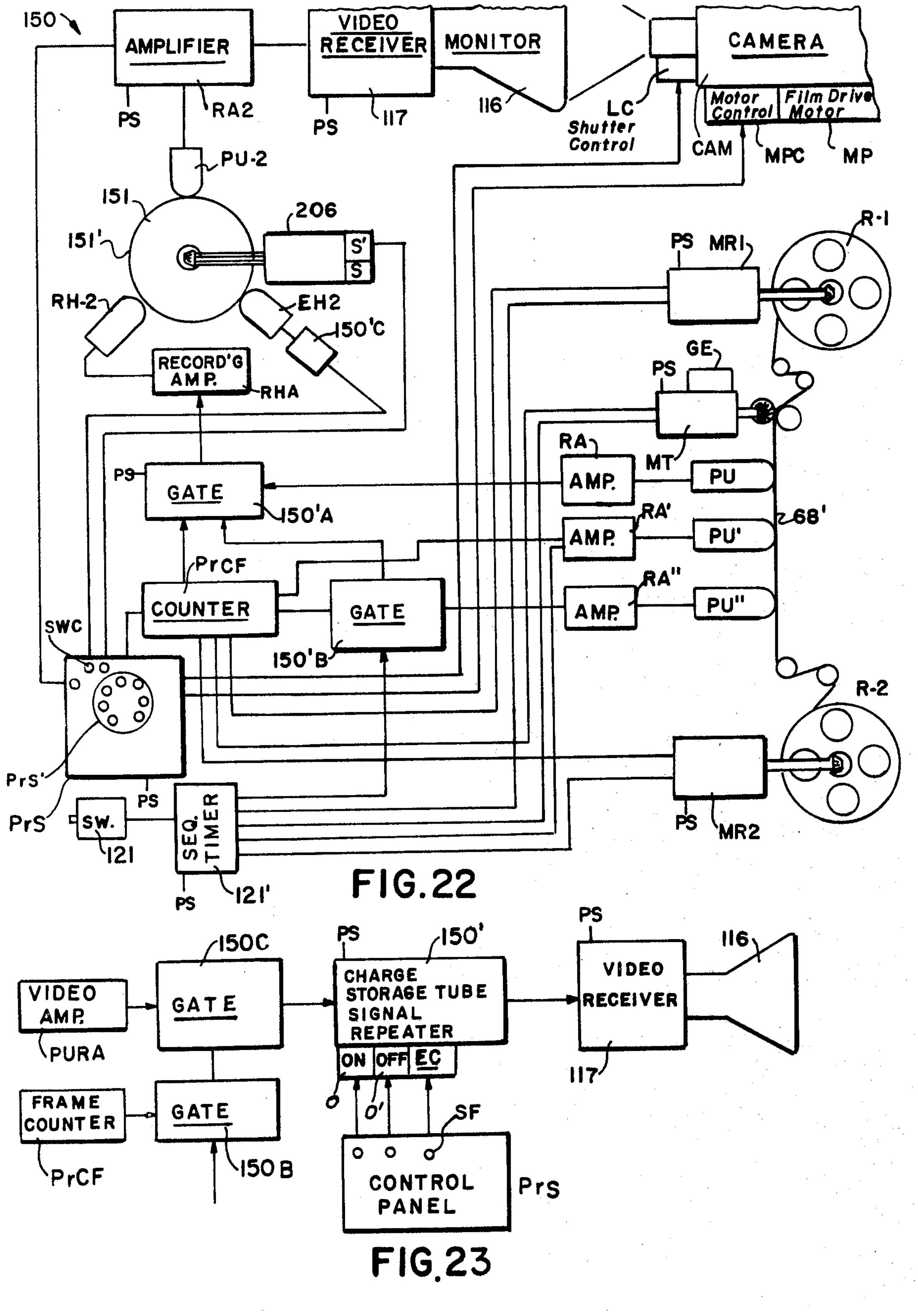
Figure 19:
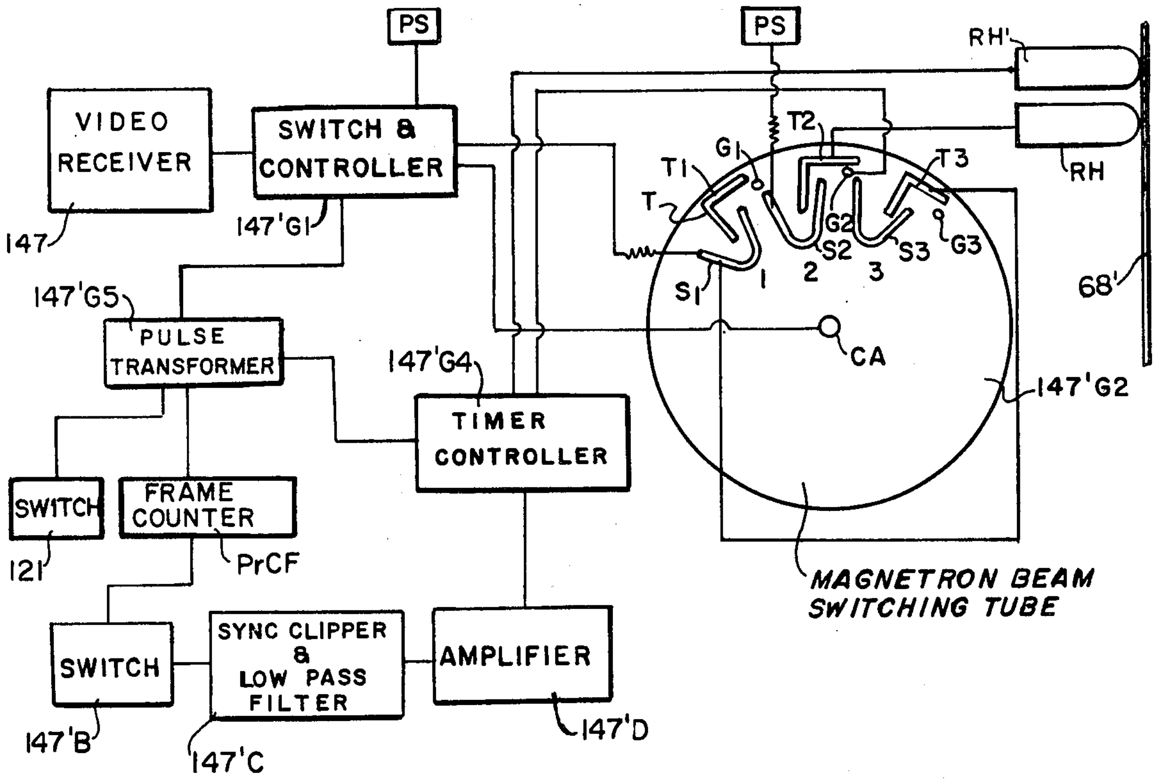
Figure 24:
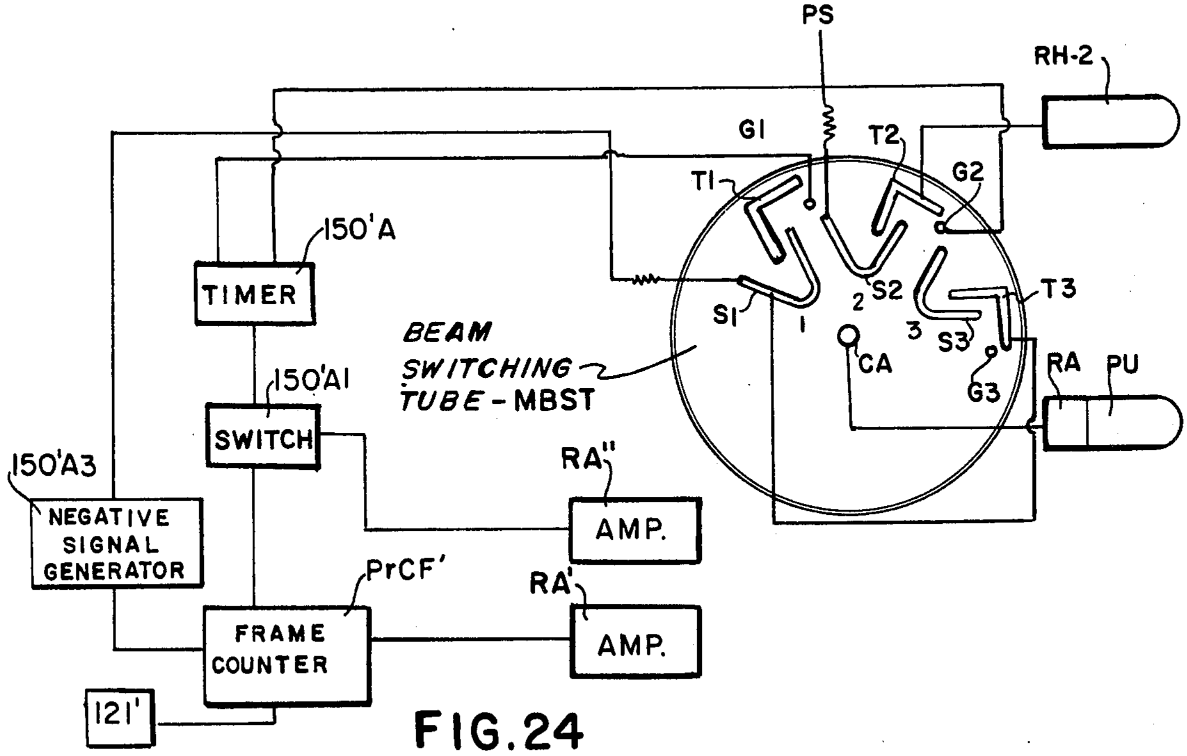
Figures 25, 26, 27, 28, 29, 30:
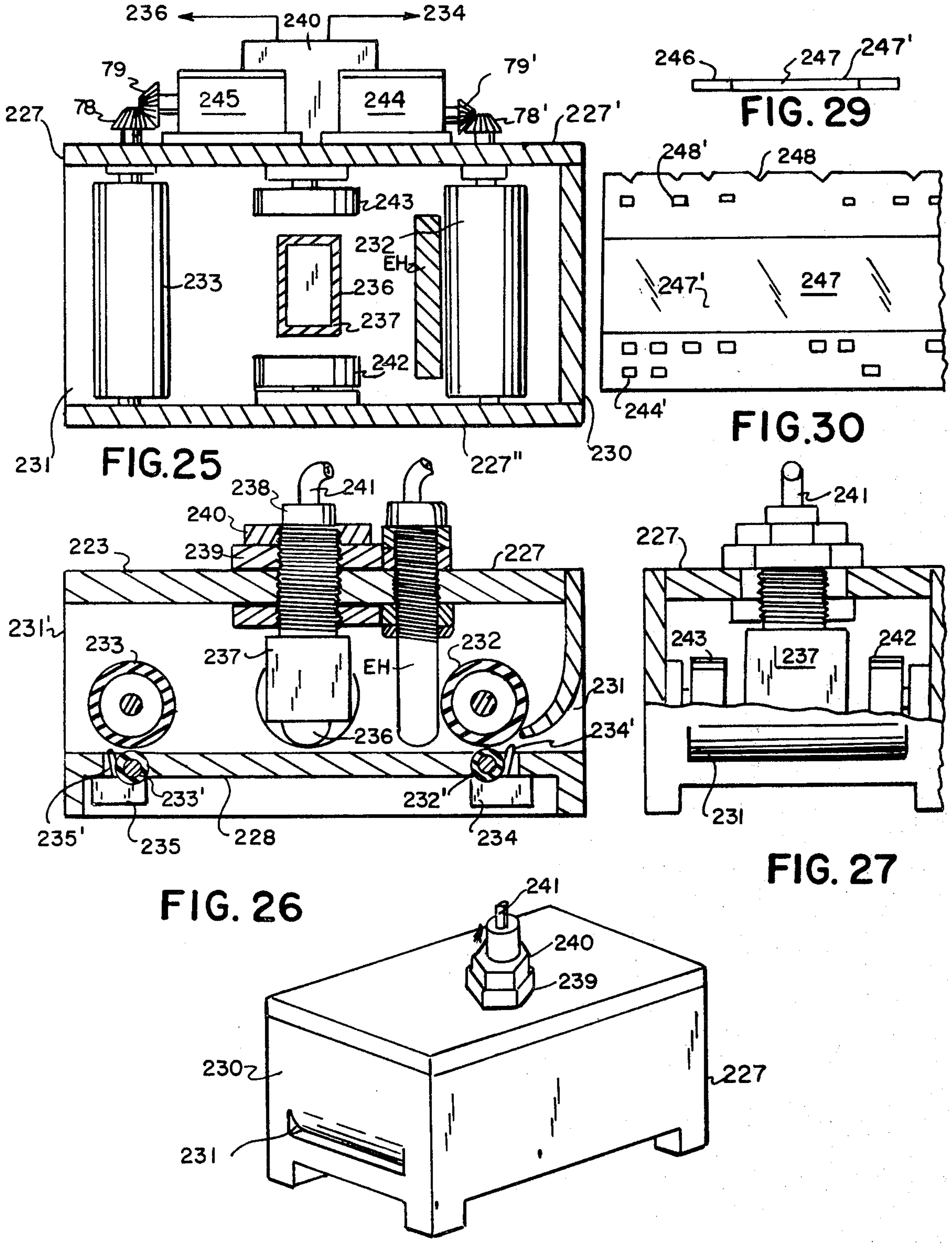
Figures 31, 32, 33:
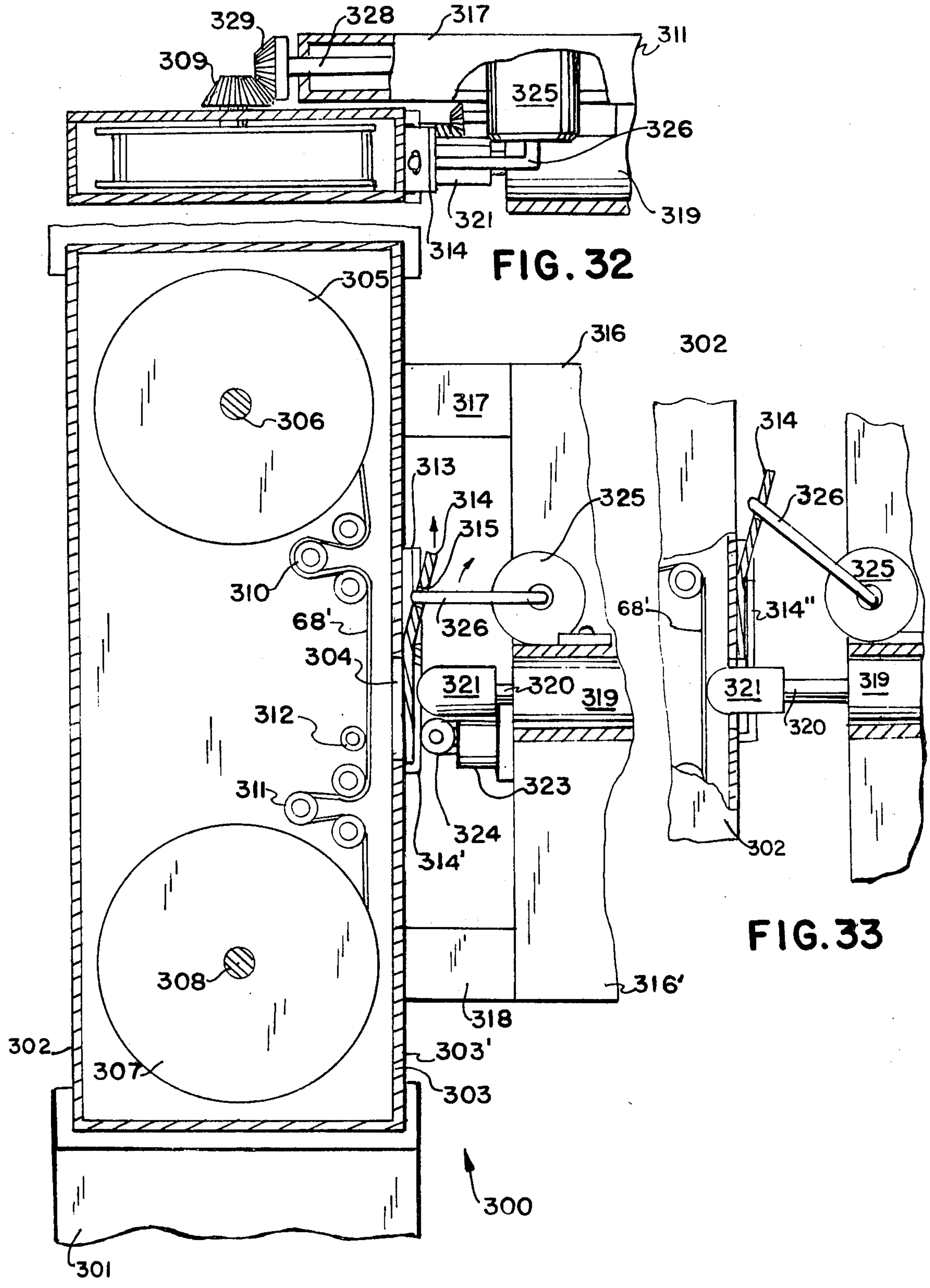

FIG. 13 is a side view with parts broken away for clarity of a modified form of magnetic tape magazine and a scanning apparatus for reproducing signals from the tape and driving the tape and shown operatively coupled to the magazine and tape;

FIG. 12 is an end view of the magazine of FIG. 13;

FIG. 14 is a side view of part of a filmstrip-containing magazine with parts broken away for clarity and shows drive means coupled to the magazine for rotating one of the reels thereof;

FIG. 15 is an isometric view of a modified form of filmstrip-containing magazine and means for driving the filmstrip of the magazine past an opening therein;

FIG. 16 is a schematic block diagram showing means for prepositioning the conveying and scanning apparatus of the instant invention with respect to a selected tape or filmstrip magazine;

FIG. 17 is a block diagram showing means for presetting predetermining controllers of the type provided in the control system of FIG. 16;

FIG. 18 is a schematic diagram showing a modified form of the system illustrated in FIG. 16; including means for generating and recording single frame picture signals onto selected lengths or frames of a magnetic recording member;

FIG. 19 is a schematic block diagram illustrating means for effecting the recording of a video picture signal onto a selected length or frame of a magnetic recording member;

FIG. 19' is a schematic diagram of one type of switching control arrangement applicable to the video picture signal recording means of FIG. 19;

FIG. 20 is a schematic diagram of another control system for magnetically recording single frame video picture signals onto selected lengths of a magnetic recording member;

FIG. 21 is a schematic block diagram showing further means for recording a single frame video picture signal onto a selected portion or length of a magnetic recording member; FIG. 22 is a schematic block diagram showing means for repeatedly generating full frame video picture signals at a frequency such that they may be utilized to modulate the write beam of a television receive-monitor to sustain a still image on the screen thereof;

FIG. 23 is a schematic block diagram showing storage tube means for generating a still image derived from a full-frame video picture signal reproduced from a selected recording area of a magnetic recording member;

FIG. 24 is a schematic diagram showing further details of one of the circuits of FIG. 19;

FIG. 25 is a top view with parts broken away for clarity of a magnetic card recorder and reader operative to record the video picture signals on selected magnetic recording areas of a card and to selectively reproduce such signals therefrom for generating visual images on a monitor screen;

FIG. 26 is a side view with parts broken away for clarity of the reader of FIG. 25;

FIG. 27 is an end view of the reader of FIG. 25;

FIG. 28 is an isometric view of the reader of FIGS. 25–27;

FIG. 29 is an end view of a magnetic recording card defining the record member insertable into the recorder-reader of FIGS. 25 to 28;

FIG. 30 is a face view of the card of FIG. 29 showing the magnetic portion thereof; and FIG. 31, FIG. 32 and FIG. 33 illustrate opening a door.

Figures 1, 2, 3:
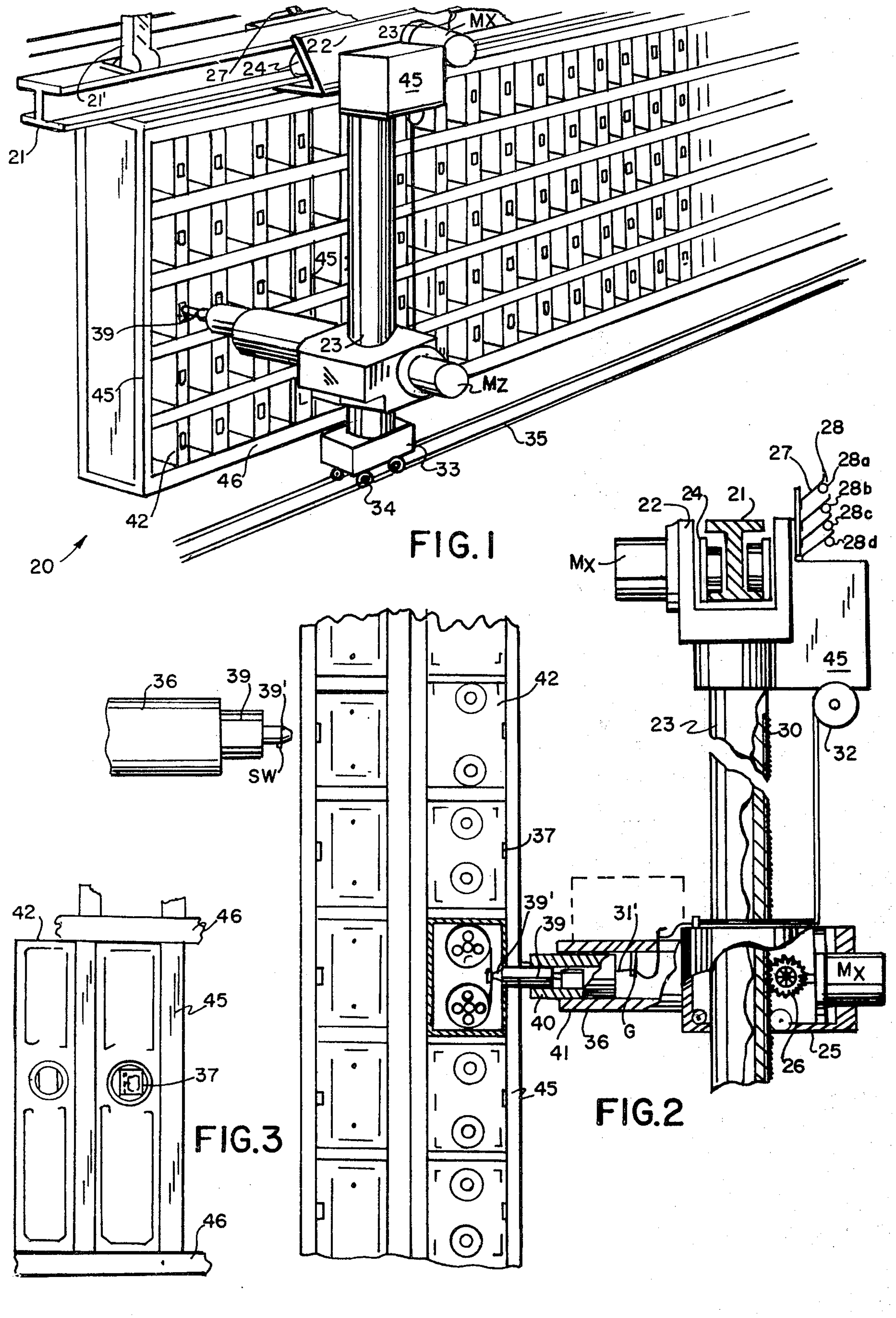
FIG. 1 is a perspective view of a television camera and a conveying apparatus therefore shown for scanning different areas of a document storage system.
FIG. 2 is a partial side view with parts broken away for clarity of FIG. 1.
FIG. 3 is an end view of a portion of the storage racking used in the system of FIG. 1.

FIGS. 1 to 3 illustrate basic components of an automatic information storage and retrieval system which components comprise; (a) A plurality of magazines 42 each containing a drivable tape 68 with recorded information thereon. The magazine is fixed in space and referenced with respect to a scanning unit, such as a television camera, (b) A scanning head assembly 39 which may, by the control of servo motors, be automatically moved to engage part of a selected magazine and to reproduce all or part of the information recorded on the tape therein for remote monitoring. The driving of the tape in the magazine to selectively position it to permit the scanning of selected information recorded thereon may be accomplished by the controlled operation of drive means coupled to said magazine and mounted adjacent the scanning head assembly 39 so as to engage a magazine tape driving mechanism. (c) Signal transmission means such as television camera apparatus employing wires or shortwave to transmit signals derived from the magazine mounted tape is provided to communicate the scanned information to a remote location, (d) conveying means for automatically prepositioning the scanning head in alignment with a selected tape magazine and to effect coupling of the scanning head with selected magazines for the reproduction of information from the tape thereof, (e) selection and control apparatus controlling the movement of the scanning apparatus and control the operation of the scanning head such that it may electrically, magnetically or optically derive information from a selected recording on the tape. Such selection and control means is also operative to control the movement of the selected tape to predeterminately position a frame thereof relative to the scanning head so that it may be scanned to generate an information signal capable of being monitored by remotely transducing same to a visual presentation of the scanned information.

FIG. 1 is an isometric prespective view of part of an information storage system having a rack 45R which comprises an array of vertical beams 45 and horizontal beams 46 joined in a cage-like assembly denoted 44 which is provided with means for holding an array of individual information storage magazines 42 thereon.

Magazines 42 are shown arranged adjacent to each other and are tiered in vertical rows one above the other. In FIG. 1 the magazines 42 are shown as each containing a length of tape 68 having information recordings thereon, with the tape movable past an opening 37 in an end wall of the magazine from one reel to another.

In the apparatus of FIGS. 1 to 3 a scanning camera or pick-up head 39' is provided and is conveyed past all the magazines of a storage rack by conveying apparatus which comprises a carriage 22 which is driven along an overhead mono-rail track 21 by a motor Mx mounted thereon. A fixture projects downwardly from said carriage, which fixture mounts a scanning apparatus 39 having a scanning head 39'. The carriage mounted fixture comprises a tubular column 23 affixed to and projecting outwardly from a second carriage and defining a laterally extending scanning head support 36 projecting from and movable up and down on column 23 and mounting the scanning head or mount 39'. Said lateral support 36 includes means for moving the scanning head laterally with respect to the second column 36 from a retracted position 39 to an extended position which is sufficient to permit it to engage tape of the information storage magazine or be positioned opposite the opening 37 therein and to thereby be in a position to transduce information recorded on the tape as it is driven past the opening. Motor means are also provided on column or platform 36 to power drive the tape in the magazine 42 through a projecting drive device, such as a shaped shaft, which is adapted to engage a mechanism mounted on the magazine when the pick-up head 39' moves into position. This has the advantage that only one tape driving mechanism is required. It is thus not necessary to provide a motor to power operate each magazine. Electrical control is also simplified.

Electric power is provided through overhead mounted conducting wires 28 which may be insulatedly mounted off the track 21. Remote control of the apparatus may also be automatically effected through the overhead wires 28 by transmitting control signals thereon or by wireless means. Notation 45 refers to a housing mounted on carriage 22 which contains signal receiving and control apparatus. The control apparatus mounted in 45 receives pulse control electrical signals generated on the wires 28, converts said signals to command control signals or holds them in relay storage, and effects control of the various motors by making and breaking circuits to position the pick-up device 39' opposite selected information storage units in the system. A motor Mx drives the carriage 22 along track 22. A motor Mz drives horizontal column 36 vertically on column 23. A third servo, Mz, which may be a push-pull solenoid, drives pick-up head 39' a sufficient degree to engage the selected magazine and is controlled in such action by a control device 45.

Conducting wires 31' extend from the pick-up head 39' through the column 36 and its supporting carriage 25 to a transmitter mounted on the column which transmits the signals generated by the pick-up head to a remote receiver. The control device 45 may include conventional television or radio transmitting apparatus.

It is noted that the illustrated overhead mono-rail conveying system for conveying the scanner or pick-up head to positions opposite selected of the magazines may also comprise an overhead bi-rail and crossbridge conveyor permitting conveyance of the pick-up head to one or more aisles between magazine storage racks, or a carriage which travels along floor mounted tracks. In another form of the invention, the information storage magazines 42 may be conveyed past one or more fixed reproduction heads.

FIG. 1 shows means for holding magazines 42 supported in orderly vertical and horizontal rows on a rack structure comprising vertical structural members 45 secured to horizontal structural members 46 each joined together where they intersect. The tape or film holding magazines 42 are secured to the members of the support structure in positions such that an exposed portion of the recording tape in each will be accessible to scanning or pick-up apparatus of the type described. The information recorded on the tapes of the magazines is preferably classified or coded such that it may be easily accessible upon command. The means for deriving information from a selected magazine is effected by automatically conveying and positioning electrically operated scanning apparatus to the selected magazine by predetermined control of the servomotors driving the described conveying apparatus. When positioned in alignment a selected magazine, the pick-up head, when necessary, is automatically driven towards and coupled to or otherwise located with respect to the recording medium in the magazine such that the information recorded on the record member in the magazine may be transduced as a varying signal and transmitted to a remote location where it is monitored or further processed. Such further processing may include conversion of said signals to visually monitorable form such as images on the face of a television picture tube screen.

The conveying apparatus for transporting the pick-up apparatus to the selected magazines may comprise any type of conveyor which will perform the desired function. FIG. 1 shows an overhead mono-rail track 21 supported on brackets 21' extending from the ceiling of the storage room, and carriage 22 is supported by track 21 and adapted to be driven therealong by an electric motor referred to as Mx. A fixture or column 23 mounted on the said carriage 22 projects vertically downward therefrom and mounts a second carriage 25 which is drivable along column 23 by a second servomotor Mz. The laterally extending column or platform 36 is affixed to a carriage 25 and adapted to travel vertically on column 23. The scanner 39 includes a scanning or pick-up head 39' which is mounted at the end of column 36 and is movable relative to column 36 and mounted within the end of platform 36. The pick-up head 39' may be of various types and may comprise transducing means for deriving signals from a recording on a magnetic surface or tape, optical apparatus for scanning picture film, or other known apparatus for scanning other forms of the known recording media. In order to transmit the signals generated by pick-up head 39' amplifying and transmitting apparatus are provided in a housing 45 mounted on the lateral column 36 adjacent to the pick-up head. Said housing may also be mounted on the vertical column 23, or the carriage 22. Electrical coupling between the movable components or assemblies illustrated may be effected by the use of sliding-brush contactors 27 or by the use of flexible wires of sufficient length to permit the maximum degree of motion between the movable components. Brushes 27 are shown mounted on the carriage 22 and overhead mounted wires 28 provide electrical coupling between the carriage and its assembly and the power supply connected thereto. The overhead wires 28*a*, 28*b*, 28*c*, etc. may also transmit command signals to the conveyor operating servo-motors from a remote location. Certain of the overhead wires 28 may also carry the signals generated by the pick-up head to a remote receiver.

Electrical coupling between the overhead carriage 22 and the vertically travelling carriage 25 is effected in FIG. 1 by a wire pair 31 which is spring wound on a take-up reel 32 mounted on the carriage 22 and electrically connected to the brush elements 27 riding on the overhead wires. In FIG. 2 the lower end of wire pair 31 is shown secured to the carriage 25, extends therefrom to the amplifier and transmitter 45 and is electrically connected to the movable pick-up head 39' by a wire pair 31' which is long enough to permit the head to project and retract.

The carriage 22 rides on the track 21, on wheels 24. Power operation of the carriage 25 vertically on column 23, is accomplished by means of a wheel or gear 26 driven by a motor Mz engaging a spur gear 30 secured to the column 23. Notation "G" refers to retainers for wires such as 31, and 31' which are mounted on and extend from the various conveyor components shown.

In FIG. 1 a carriage 33 is secured to the end of column 23 and has wheels 34 rotationally mounted thereon which ride on a track 35 secured to the floor of the storage area.

The pick-up head 39' is shown movable mounted in a housing 40 which is threadably mounted at the end of column or platform 36. Notation 39' refers to the scanning head which is part of an assembly or housing 39 and which may comprise magnetic reproducing head or heads, a lens of an optical scanning device supported within 39, such as a television camera, or other means for deriving signals of the recordings on the tapes in the magazines 42. The head 39' may also contain means for driving the tape within 42 automatically past the opening 37 in the magazine, and means for recording and reproducing signals relative to the tape.

In FIG. 2 a limit switch SW projects from the head 39' which may be used to effect stoppage of housing 39 after head 39' has just entered the opening 37 in the wall of magazine 42. The switch SW may be adapted, when actuated, to stop the operation of the lineal motor or solenoid 41 driving head 39' outwardly from 36.

Notations 43 and 44 refer to respective tape reels rotationally mounted within each magazine 42. In the arrangement shown in FIG. 2, no means are shown for driving the tape 68 past the pick-up head 39'. Such drive means may be inherent to the storage racking or to each magazine by means of suitable electro motors and conventional tape drive mechanisms. Such tape drive means may be effected as illustrated in the other drawings by command control effected from a remote location such as by a person viewing a screen capable of displaying images of the recordings on the tape or by remotely located computing means. In another arrangement involving the automatic driving of the tape in the magazine, a limit switch SW' may be provided to be actuated when the pick-up head 39' passes into or becomes aligned with the opening 37 of a selected magazine.

FIG. 3 shows two magazines 42 secured between vertical rack members 45 and horizontal members 46. Switch SW' is shown mounted just below the magazine openings 37.

Figure 4:
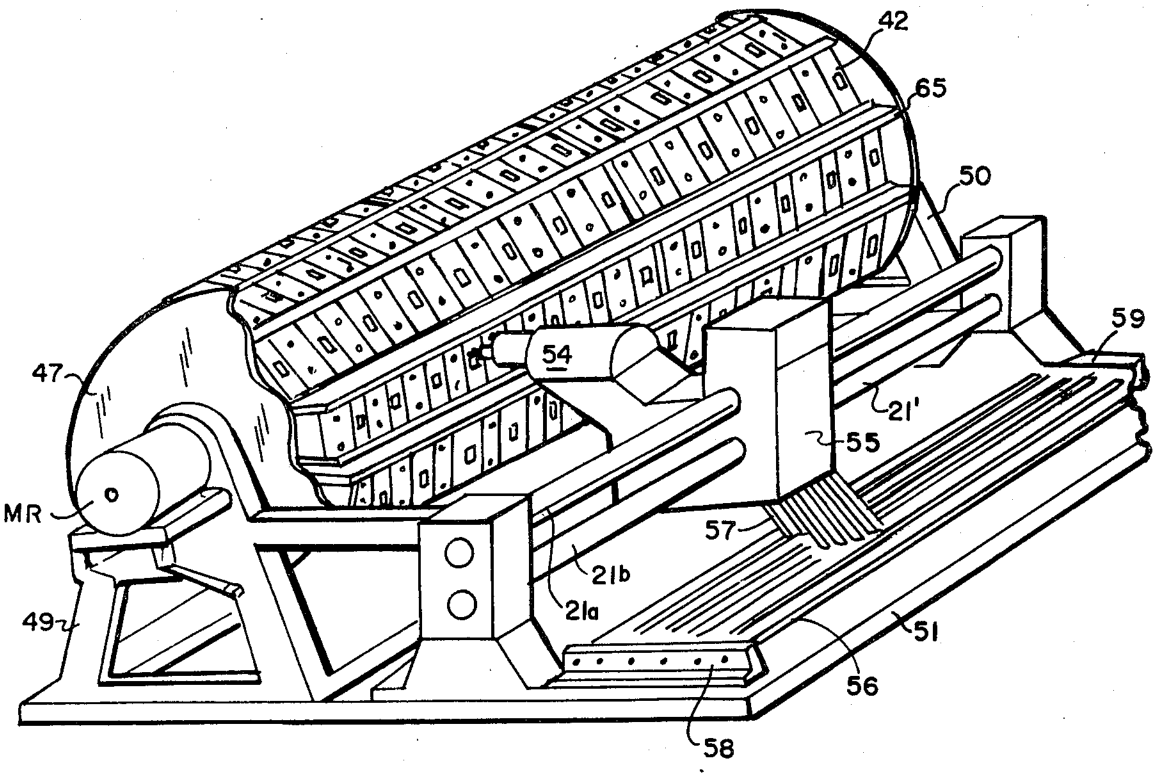
FIG. 4 is an isometric view of a modified form of the apparatus shown in FIG. 1 wherein a rotary units is used for storing magazines or containers of information.
Figure 5:
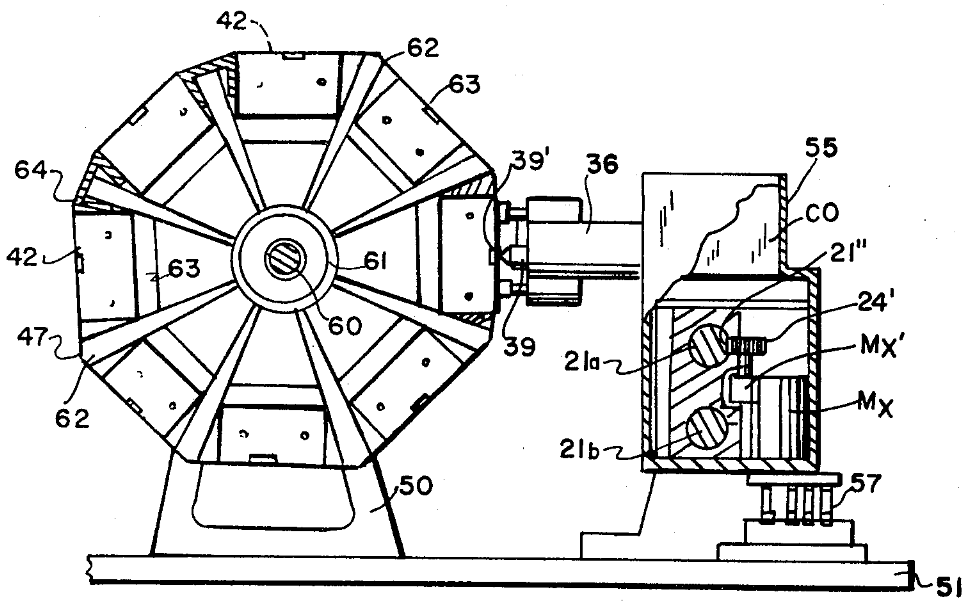
FIG. 5 is a side view of the apparatus of FIG. 4 with parts broken away for clarity.

FIGS. 4 and 5 show a modified information storage system utilizing a reproduction head or camera 39' which is movable in a path adjacent to a drum or cylindrical assembly 47 of rows of magazines. The drum 47 is power rotatable on an axis and may be stopped in rotation to preposition a particular magazine mounted thereon, with respect to the pick-up head 39'. By command controlling movement of a carriage 55 supporting a head 39' in its travel along a trackway 21' composed of parallel rod members which are supported parallel to the drum assembly 47, and controlling rotation of drum assembly 47, any peripheral location of the drum assembly may be aligned with the head 39' for selectively reproducing or recording information.

In FIG. 4 a carriage 25 mounts a scanning head assembly 39 which may be operative to mechanically engage and drive a magazine containing exposed photographic film and optically reproduce and relay signals of the picture information scanned to a remote location or to mechanically engage and drive a magazine containing a magnetic recording and convert said recording to electrical signals which are transmitted to a remote location. The scanning head 39' is mounted on a carriage 55 which is driven by a motor Mx along a track 21' supported adjacent mount 47. By control means of the type shown in FIG. 18 the carriage 55 may be automatically stopped at any selected position along track 21' to preposition the scanning head 39' of assembly 39. The drum 47 which is a cylindrically shaped skeletal frame containing an array of magazines 42 which are arranged in circular groupings, functions essentially as a rotating storage rack. It is driven in rotation by a motor MR. Control of the apparatus of FIGS. 4 and 5 may be effected by conttrollably indexing the drum 47 under the control of a remote control means to stop at a selected radial location such that the magazines of a longitudinal row thereof will be selectively accessible to the lineally travelling reproduction head 39'.

The cylindrical frame or drum 47 is rotationally mounted on bearings supported by end blocks 49 and 50 which are mounted on a bed 51, or on the floor F. The trackway 21', on which the carriage 55 is mounted, is supported on end pillow blocks 52 and 53 which are supported by bases secured to the bead 51. Projecting from the carriage 55 is an arm 54 supporting an assembly 39 containing a scanning head 39' as described. Carriage 55 is driven along trackway 21' which comprises two rod members 21a and 21b supported at each end. The scanning head 39' is driven towards the drum 47 to engage a selected magazine in that row which is prepositioned relative thereto by operation of a motor MY.

Control signals and electrical energy are supplied to the motors and electrical devices mounted on the carriage 55 by means of exposed wires 56 which are insulatedly supported by end brackets 58 and 59 which are secured off the base 51 as shown. Brushes 57, insulatedly mounted on and extending from the carriage 55, make a sliding contact with the wires 56 and are connected in circuit with the various servo motors and a sequential command control device CO mounted on carriage 55. The wires 56 and brushes 57 function as described and may be replaced by a single slack cable such as 31' of FIG. 2.

FIG. 5 shows means for mounting magazines on the frame 47. The rack is composed of spoke members 62 secured to and extending radically from a drum 61 mounted on a shaft 60 adapted to rotate on bearings in end supports 49 and 50. Longitudinally spaced sets of said spoke members may be joined by longitudinally extending stringers 65, at or near their ends. Notation 64 refers to V-shaped brackets secured to the spokes 62 and adapted to hold the magazines 42 in place. Stringers 65 extend longitudinally along the rack and are fastened to the spokes 62 inwardly of the outer periphery of the rack and support the end walls of the magazines. FIG. 5 also shows the housing of carriage 55 partially sectioned. A motor Mx is mounted on the base or bottom of carriage 55 and is adapted to drive the gears of a gear box Mx' which includes a circular gear 24' engaging a rack gear 21'' secured to one of the two illustrated tracks of trackway 21'. Motor Mx also contains the stop-start, reverse and speed controls which are activated by remote control means to be described and by signals transmitted along the conductors 56 and 57.

Figures 6, 7, 8:
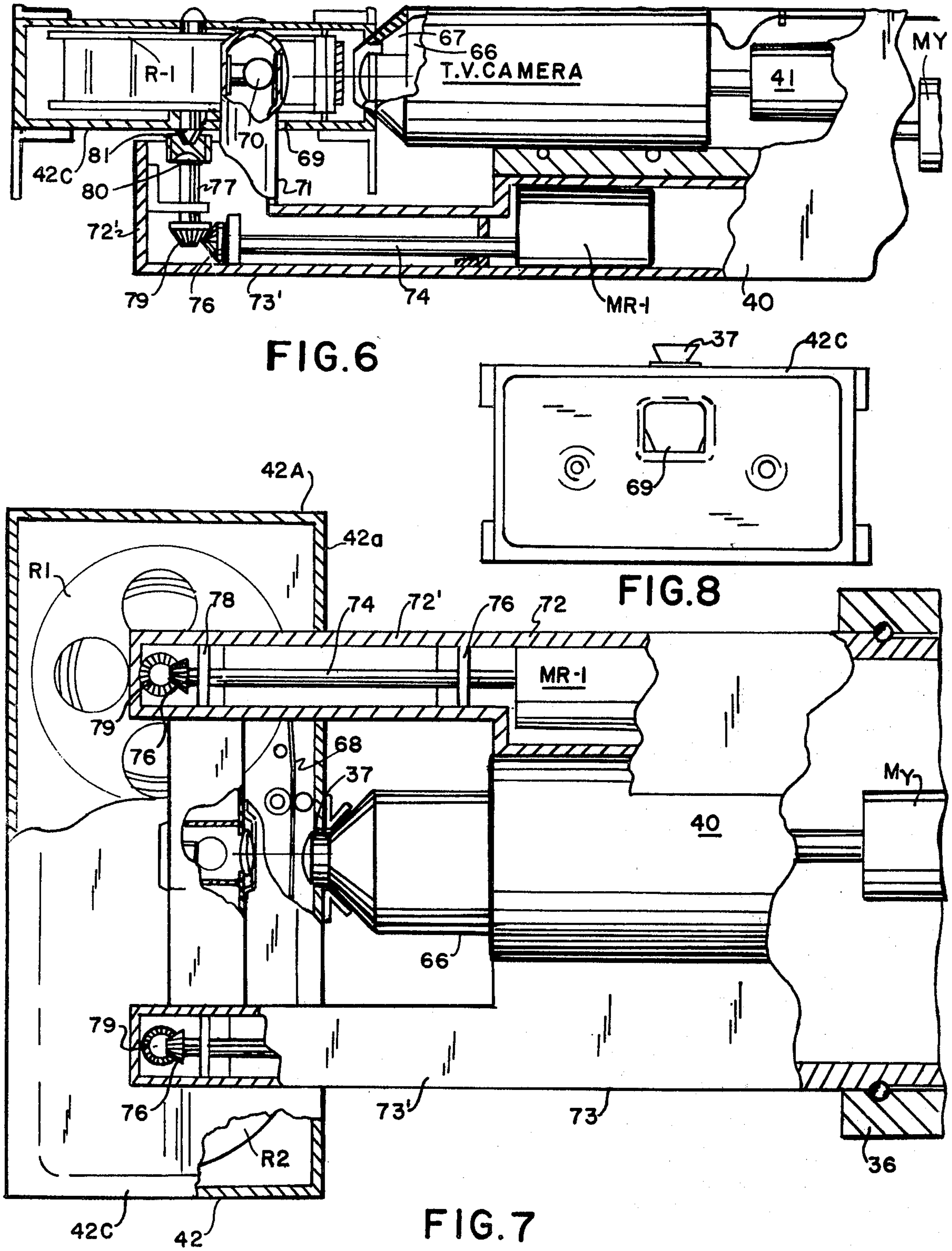
FIG. 6 is a top view with parts broken away for clarity of one form of electro-optical scanning apparatus coupled to a filmstrip-containing magazine and applicable to either of the arrangements illustrated in FIGS. 1–5.
FIG. 7 is a side view of the apparatus of FIG. 6 with parts broken away for clarity.
FIG. 8 is a side view of a filmstrip-containing magazine of the types provided in FIGS. 6 and 7.

FIGS. 6 and 7 show a first magazine structure having, as the recording medium thereof, lengths of motion picture film. The magazine has a housing having parallel side and end walls which support two rotatable reels having film strip windable from one to the other, and also support tape guide means such as pins and rollers which guide the tape in its travel from one reel to the other.

FIGS. 6 and 7 also illustrate scanning apparatus for scanning the images of a magazine contained filmstrip which apparatus is operative to generate a video signal capable of being transduced to and projected as an image on a television tube screen. As the design of a conventional television tube screen. As the design of a conventional television camera or iconoscope is known in the art, the camera components are not shown but are assumed to be housed in housing 66 and may also be provided in the apparatus of FIG. 2. The pick-up head 66 comprises, in FIGS. 6 and 7, an aperture and lens housing 67 which is shown positioned in alignment with opening 37 in the end wall 42*a* of a selected magazine 42A.

The apparatus of FIGS. 6 and 7 is mounted on a conveyor assembly of the type hereinbefore described and also includes means for driving the film 68 within a selected magazine past an opening 37 in the end wall 42*a* thereof and means for providing sufficient light to illuminate the film to permit suitable scanning by the optical pick-up apparatus or camera 66. If the tape or film 68 is a positive print, a light source may be mounted just above the lens mount 67 of the camera, as shown in FIGS. 8′ and 8″ to illuminate the picture recordings on 68. However, if the film 68 of FIGS. 6 and 7 is microfilm or motion picture film an opening 69 is provided in the side wall 42c of the magazine housing 42H just behind the length of film extending between the two reels R-1 and R-2 illustrated in FIG. 7 to permit light to be passed to the T.V. camera. The reels R-1 and R-2 are supported in bearing by the side walls of the magazine 42. A light source 70 is insertable into said opening 69 and positioned behind the film 68. The light source is secured at the end of an arm 71 which is rigidly secured to the supports 72 and 73 at the end of an assembly which extends from the lateral conveyor arm 36 of the apparatus described above. The assembly of FIGS. 6 and 7 includes an arm or platform 40 which is movably mounted on the arm 36 extending from the conveyor carriages 25 and movable to engage a selected magazine by means of a servo motor or solenoid mounted on arm 40; a camera or pick-up head 66 which is axially movable relative to arm 40 by a servo motor or solenoid 41 mounted on arm 39; means mounted on arm 40 comprising an upper housing 72 in which is supported a motor MR-1 having a shaft 74 extending to near the free end thereof which shaft is supported in bearing by brackets 75 and 76 secured to the walls of housing 72 and a second shaft 77 coupled to shaft 74 through bevel gears 78 and 79. The second shaft 77 projects beyond the wall of the housing 72′ and is provided with an end member 80 which is operative to engage a coupling member 81 at the end of a shaft 81 on which the upper reel R-1 is mounted and to thereby rotate said reel when the servo motor MR-1 operates. The lower housing 73 is similar to upper housing 72 having a motor MR-2 and shafts mounted thereon. The two elongated sections 72′ and 73′ of the housing 72 and 73 are jointed by a column 82 which mounts the lamp containing housing 71 which projects outward therefrom as illustrated in FIG. 6. The light housing 71 and shaft ends 77 are moved to the position illustrated in FIG. 6 to both preposition the light source 70 behind the film 68 and engage reel drive shafts 81 and 81′ to drive the respective reels by suitable automatic control of the motors MX, MZ, MY, the motor or solenoid 41 which controls the motion of the base 40 axially relative to the column 39 and reel drive motors MR-1 and MR-2.

Automatically controlled operation of the scanning apparatus is effected as follows: The motor MX drives the assembly 40 to position housing 71 adjacent a selected magazine. The servo is then controlled to project the assembly 40 a degree such that housing 71 is positioned at the opening in the side wall of a selected magazine. Motor MX is then controlled to move the end of housing 71 into the opening 69 so that the light source 70 thereof may project a light beam through the filmstrip 68. The head 66 is then automatically projected from 40 by controlling servo 41 to cause scanning head 66 to engage the opening 37 so that said head 66 is positioned to receive light from lamp 70 after it has passed through filmstrip 68. The tape 68 is then controllably driven from one reel to the other and the information thereon may be remotely displayed as a motion picture or separate images. After displaying the information recorded on the film 68 the head 66 may be retracted and removed from the vicinity of the magazine.

Figures 9, 10, 11:
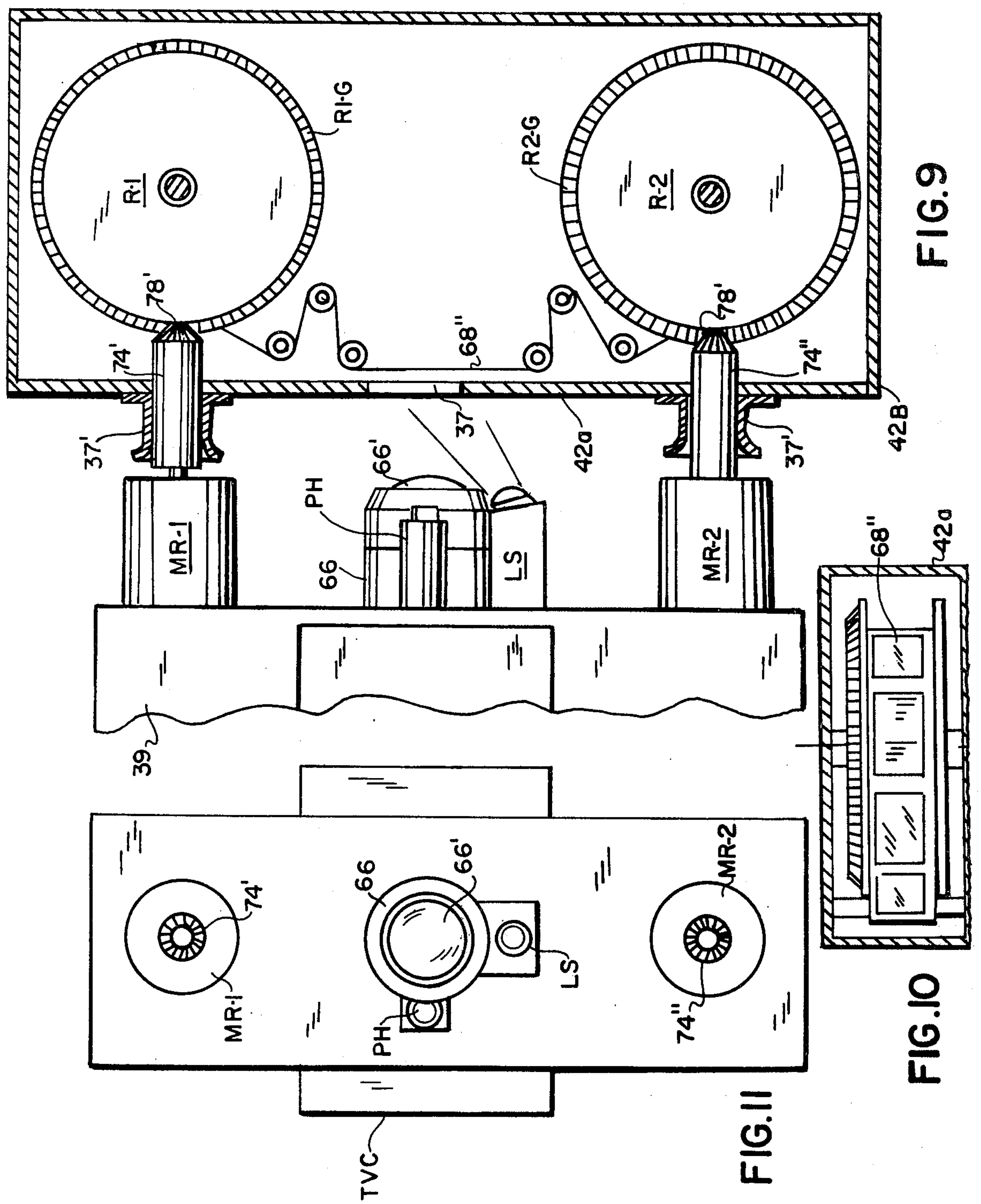
FIG. 9 is a side view with parts broken away for clarity of a modified form of filmstrip-containing magazine and a scanning and driving apparatus for the filmstrip in the magazine.
FIG. 10 is a top view with parts broken away for clarity of the magazine and scanning apparatus of FIG. 9.
FIG. 11 is an end view of the scanning and drive apparatus of FIG. 10.

FIGS. 9 to 11 show a modified type of magazine 42B and associated scanning apparatus whereby the scanning means comprises a television scanner TVC such as an iconoscope camera and its associated optical components 66 which, in this embodiment, is used to scan the surface of a tape containing different printed of developed information occupying frames thereof.

The magazine shown in FIGS. 9 to 11 is unlike that described above in that it has no opening in the side wall thereof to accommodate a light source such as provided in the embodiment of FIGS. 6 and 7 since the camera 66′ scans the surface of the tape 68′ through the opening 37 in the end wall and does not require the passage of light through filmstrip. The tape 68″, which may comprise paper or plastic with positive prints or photographs representing the frames thereof, is shown winding from a first reel R-1 onto a second reel R-2, both of which are supported in bearing between the side walls 42*e* of the magazine housing. An opening 37 in the end wall 42-*a* of the magazine housing exposes a portion of the tape 68″ for scanning. Notation 66′ refers to the aperture end of the television camera TVC which is mounted on the end of the described arm 36. The aperature end 66′ of camera TVC is located to scan the surface of tape 68″ exposed through the opening 37 in the end wall 42*a* when coupling is made with the selected magazine. Two drive motors MR-1 and MR-2 are shown mounted on the arm 36 with each having projecting drive shafts 74′ and 74″. bevel gears 78′ are secured to the ends of shafts 74– and 74″ and engage the peripheral edges of respective magazine reels R-1 and R-2 which peripheral edges have bevel gear teeth R-G formed therein. Such drive means may also comprise suitable friction-drive means. The shafts 74′ and 74″ are supported and further positioned relative to the rims of reels R-1 and R-2 by tubular guide members which are secured to the end wall 42*a* and extend perpendicularly therefrom as shown. The projecting ends of tubular members 37′ are flared outward to allow for variations in the alignment between column 36 and the selected magazine.

The camera aperature TVC is shown positioned just opposite the magazine opening 37 with the gears 78′ coupled to the reel rims RG. The lens system of camera TVC is adjusted to properly focus with respect to the images of the tape 68″ when the camera is located as shown. A light source LS is mounted adjacent to and behind the aperature 66′ of the camera and is of sufficient intensity to suitably illuminate the surface of the tape 68″ when the camera is in the coupling relationship illustrated.

The image scanning camera TVC need also not make physical contact with the magazine housing but may be positioned for scanning a short distance therefrom. By selectively controlling reel drive motors MR-1 and MR-2, searching may be effected by the observer who, if the drive speed is slow enough, may scan successive frames of film or tape 68'' defined by viewing the image tube and, by manual control means may remotely stop the motor tape drive to hold any frame in view by stopping the drive thereof.

Notation 37'' refers to a conical receptacle circumscribing the opening 37 in magazine housing 42 which is utilized to guide, align and position drive shafts 74', 74'' relative to the magazine tape 68 and the reel drive gears. Notation PH refers to a camera housing to scan and indicate by variations in light intensity received therefrom, the passage of each frame or section of said tape past opening 37. The cell PH may be used for tape frame selection and speed control.

FIGS. 12*a* to 12*e* show a magnetic tape containing magazine and associated magnetic recording and pickup apparatus for automatically effecting the functions of erasing and recording signals from remote sending apparatus relative to a magnetic tape 68' therein, and reproducing signals recorded on the magazine wound tape 68' and effecting the transmission of such signals to a remote receiver. At least three heads are shown mounted adjacent to and in line with each other and extend from a common base or housing 39 which is conveyed as hereinbefore described past an array tape containing magazines. The heads shown comprise a magnetic erasing head EH operative to erase, when energized, signals from the tape 68' of the magazine 42*a* when the tape is driven past said head. Such erasure prepares the tape for magnetic recording by a recording head RH. The notation RH'refers to a recording head disposed near an edge of the tape 68' and operative to record synchronizing or timing signals thereon. A magnetic pick-up head PU of conventional design is provided and a separate pick-up head PU' is operative to pick-up the synchronizing pulses recorded by head RH' for control purposes as will be described.

An opening 37' in the magazine end wall 42*e'* is shaped to permit all the heads to be inserted into the tape magazine housing into operative relationship with the tape 68'. The transducing heads are secured to base 39 by a housing 99 having a receptacle portions 98 adapted to engage and hold said heads. The housing 99 also mounts the motors MR-1 and MR-2 which function to drive the magazine mounted tape reels R-1 and R-2 as hereinbefore described. Notations 100, 101, 102, 103, 104 and 105 refer to wires for powering extending reel motors MR-1 and MR-2, tape motor MT and heads EH, RH, PU, etc. MR-T is a servo motor which drives the tape 68' coactively with motors MR-1 and MR-2. The output shaft 106 of motor MT is coupled through bevel gears 107 and 108 to drive a wheel 108' which wheel is rotationally mounted on an arm 109 supported by housing 99 which positions it against the tape 68' as it rides against a free wheeling depressor wheel 96 which is rotationally supported in bearing between the side walls of the magazine 42 and the two wheels cooperate to drive the tape.

The transducing heads EH, RH and PH are operatively prepositioned relative to the tape 68' when the front face 99' of the housing 99 engages and seats against a guide 94' which is secured to the magazine peripherally about opening 37' therein. Notations 95, 95', 96' 96' and 97 define idler wheels which are free wheeling and rotatably supported by the walls of the magazine housing, and serve to operatively guide the tape 68' with respect to the transducing heads projecting through the opening 37' in the end wall of the tape magazine.

FIG. 13 shows a modified magazine structure and associated coupling arrangement. A tape reel R-1' is rotatably supported by the side walls of the magazine housing 42E. The periphery of reel R-1' contains gear teeth 113' formed integrally therein, which teeth are shown engaged by a circular gear 113 connected to a motor 111 and rotationally mounted on a support 110 which is supported by the base 39 which also supports the pick up head 39' such that both are simultaneously moved to drive the reel and transduce with respect to the tape. Thus reel R-1' is driven by the motor 111 mounted on support 110 and driving gear 113 through bevel gears 78 and 79 when the scanner and selected magazines are operatively coupled together. Notation 114 relates to a guide projecting from support 110 which engages the end wall 42*a* of magazine 42 to preposition support 110 during the transducing operation.

FIG. 15 shows a film drive means associated with a modified form of selectively positionable scanning apparatus of the type described which employs two sprocket wheels 115 and 115' rotationally mounted and positioned on respective support means 110' located at respective sides of the pickup and erase heads to engage border extending holes H such as provided in tape or conventional motion picture film. When the sprocket wheels 115 are rotated by a motor 111 through bevel gears 78 and 79 after engaging tape 68, the record member 68 may be automatically driven past the opening 37 in the magazine housing 42F. A guide wheel 96 is rotationally mounted behind the filmstrip 68 and is provided with spaced slotted cavities H' therein to receive the teeth of the sprocket drive wheels 115 and 115'. The erasing, recording and reproduction heads, EH, RH, & PU, are shown mounted between the wheels adapted to engage the surface of the tape 68.

FIGS. 16 to 23 show systems and components for controlling apparatus of the type described herein. Certain assumptions are made with respect to the control systems illustrated, viz. (a) A source of power or electrical energy is assumed to be provided on the appropriate sides of all switches, counters, controllers, and other components. (b) Switching may be effected by direct switch closure by control pulses transmitted to the controlled components over wire, microwave or short wave channels. Conventional means for transmitting power or control signals are assumed to be employed for effecting the described automatic control recording of information.

FIG. 16 shows means for controlling the conveying apparatus of FIGS. 1 to transport and preposition the magazines, TV cameras or signal pick-up devices previously described, or suitable recording apparatus, with respect to a selected information storage magazine.

Notation 148 refers to a control panel having manually operated automatic selection controls denoted PrS, which includes a rotary selection switch PrS' of the type used in automatic telephone circuit selection. Other manually operated controls are also provided to effect further automatic control of the scanner conveying apparatus operative to sequentially control the various servo motors and thereby predetermine the movement of the conveying apparatus to position the pickup or reproduction scanner opposite a selected information storage magazine and to further control the movement of the information storage medium therein. The control panel 148 is connected by wires 118 to transmit control signals or pulses to receiving means located on the conveying apparatus on the overhead conducting lines 28*a*, 28*b*, 28*c*, etc. Notation 124 refers to a receiver for amplifying and transmitting the control signals to predetermining counters denoted PrCMX, PrCMY, etc. which are operative for effecting control of the servo motors and other devices described for effecting controlled movement of the scanner conveying apparatus. The receiver 124 contains automatic switching means for distributing the pulses transmitted from rotary switch PrS to the corresponding predetermining counting devices denoted by the general notation PrCM. A first predetermining counting device PrCMX controls operation of the servo motor MX and a second counter PrCMZ controls operation of motor MZ or motor MR of FIG. 4. Control is effected by transmitting a first pulse to the forward drive starting control of the particular servo motor and the transmission therefrom of position indicating pulses generated so the conveying apparatus is driven to uncount each of the preset predetermining counters. The uncounting pulses are generated either by a switch 123 actuated by rotation of the particular motor shaft or by a limit switch. The switch generated pulses are transmitted to uncount the preset predetermining PrCM counters. Upon uncounting, a particular preset counter generates a control pulse which is transmitted to energize a particular control or relay such as one defining the stop control of the particular motor controlled thereby. The motor start and stop controls are denoted F and S in FIG. 16 and notations R refer to the reverse drive controls for the motors. A second pulse, generated simultaneously with the first pulse, is effective to stop one motor and energize a relay in the start control F of the next motor thus starting same and a third pulse closes a circuit between the motor shaft actuated switch 123 for the next motor and the next control counter thus effecting automatic positional control in discrete steps.

Controlled drive of the recording medium or tape 68 at the selected magazine is effected by controlling the operation of motors MR-1, MR-2 and tape or filmstrip drive motor MT. These motors are controlled in their rotation either by forward and reverse switching controls forming part of control panel 148 and manually operated by the observer denoted OB who monitors a viewing screen 116 or by predetermining selection control means activated by properly operating the rotary switch PrS′ which presets a predetermining counting control device PrCF operative to control either the tape reel motors and/or the tape driving motor MT by utilizing position indicating feed back pulses generated by reproducing frame indicating pulses from the tape by means of the pick-up for the frame indicating pulses.

As said automatic switching system for distributing the pulses transmitted from pulse generating rotary switch PrS′ to the respective control counters PrCMX, PrCMY, etc. is not illustrated in FIG. 17, a multiple circuit control switch, which may form part of the receiver 124, is shown in FIG. 17. The switch has a switch wiper arm 124′-1 rotatable on a shaft 124′-2 and operative to sweep equispaced, multiple surface contact elements 124′-4 which are electrically connected to each of the predetermining counters or control relay banks denoted PrCMX, PrCMy, etc. In FIG. 17 counter PrCMX comprises three counting decades of relays or banks, denoted PrCMX-1, PrCMX-2 and PrCMX-3, which are adapted to count from 1 to 999. The first number dialed will thus effect the setting up of relay bank PrCMX-1 which counts hundreds, the second number dialed will set up relay banks PrCMX-2 which counts tens and the third number dialled will set up relay bank PrCMX-3 to count out units. The circuit 118-2 transmits the control pulse generated when the dial of rotary switch PrS′ has run out and effects motion of the switch wiper arm 124′-1 to the next output terminal by energizing a relay for operating a solenoid 124′-5 which drives the shaft 124′-2 the correct angular degree to position said wiper arm engaging the next terminal of the switch. A ratchet and pawl drive coupling solenoid 124′-5 and shaft 124′-2 may effect the required angular movement of the shaft of the rotary switch each time said solenoid is energized. Notation 124′-3 refers to a brush contacting the shaft 124′-2 for effecting rotary electrical connection of line 118-1 and the solenoid 124′-2 as the shaft of the latter rotates. A circuit is thus completed at each angular position of arm 124′-1 between the respective relay bank and the repeating pulse generating device defined by rotary switch PrS′. The switching pulses which energize 124′-5 are generated, as stated, on line 118-2 each time the dial PrS′ runs out thereby closing a new circuit with the next relay bank for transmittal of the next dialed number of pulses thereto.

The blocks denoted PS refer to power supply means which are connected to operate various power operated electrical devices forming part of the control system whether such power supplies are shown or not. Notation S relates to position indicating stops located to actuate limit switches projecting from certain of the movable conveying components operative to effect stoppage of a particular motor driving one component when it arrives at the stop and to simultaneously effect the starting of another motor driving a second component to effect a step-like control sequence. Control of the various servos of the invention may be attained by the feedback of position indicating pulses or signals to uncount preset counting devices by activating position indicating switching means to indicate the movement of the carriage assemblies of apparatus to predetermined locations. A stop, for example, may be used to indicate and determine an at-rest or home position for the carriage 22 while other stops indicate the forward and reverse position of the pick-up head 39′. The projected position of scanner 39′ may be defined by its engagement with the end wall of the selected magazine. A retracted stop portion of 39′ may be defined by a stop forming part of arm 36 or housing 39.

The conveying apparatus shown in FIGS. 4 and 5 may be controlled by a modified form of the apparatus of FIG. 16 wherein the servo motor Mz of FIG. 16 is replaced with the motor MR of FIGS. 4 and 5 wherein motor MR may be rotationally controlled to controllably position the drum shaped rack 47 so that a selected of the radially spaced magazines held thereby may be accessible to the linearly moving scanner head 39′.

FIG. 16 provides control means whereby an observer at a remote monitor station may effect control of the motion of said conveying device from a first, or at-rest position into alignment with selected information storage units or magazines by dialing a rotary selection switch or actuating selection switches on a control panel, which switches are operative to preset selection devices to automatically effect the control of the motion of the conveying apparatus and scanner to any selected information storage unit or magazine and effect the further operations necessary to position said pick-up head for deriving information therefrom. The observer OB faces a viewing screen illustrated as a television picture tube and effects the reproduction of information from selected information storage units as visual images on the television viewing screen. Automatic selection-control means such as punch cards, keying devices, or command components of computing devices may also be employed to replace the manual selection control means described.

FIG. 16 illustrates means for deriving information from a selected tape magazine of the information storage system from a magnetic tape having video signals thereon which are reproducible as still images on the screen of a television receiver tube. It is noted that the apparatus illustrated in the other drawings may also be applied to FIG. 15 and may be operative in accordance with features of the control system of FIG. 16. For example, if a television scanning system such as defined by the apparatus of FIGS. 6 to 8 is utilized in place of magnetic reproduction devices of FIGS. 11 to 14, then conventional television transmitting and receiving means may be employed to provide picture reproductions of the picture information recorded on the film or tape at a remote viewing station or at copy reproduction apparatus. The control means of FIG. 16 is therefore subject to variations as follows:

I. Manual selection means is provided to control the operation of the scanner conveying apparatus so that the information pick-up or reproduction head which is mounted on arm 39 may couple to a selected information storage unit and will be positioned to derive information therefrom. Selection of a magazine for scanning is effected by dial operating rotary stepping switch PrS′ to cause said switch to generate and transmit pulse signals to a control computer CO, which is provided either at the monitor station or is situated in a housing 45 mounted on the conveying apparatus. Computer CO may comprise an array of predetermining counters or decades of counting relay banks which are predeterminately set-up or programmed by the pulse train generated by rotary switch PrS′.

II. Command control of the scanner conveying apparatus is effected in one of a number of manners such as by generating feed-back pulses as the servo motors Mx, My, Mz, etc., operate, a selected number of which pulses define a predetermined number of rotations of a particular motor indicating, for example, that the Motor Mx has driven the conveyor to a position opposite a selected information storage unit. The feed-back control pulses may be generated by limit switches 123 actuated by rotation of each motor shaft or drive mechanisms associated therewith, or by means of a photoelectric switch which is actuated with movement of the conveying apparatus along its track. In patent application Ser. No. 449,874 entitled "Automatic Production Systems," now abandoned, a photoelectric cell is employed to scan the storage racking and is activated by color marks or reflectors RE positioned at each storage location. The photoelectric cell may thus be used to generate position-indicating pulses. Similarly, a limit switch may be actuated as the conveying apparatus moves with respect to the racking. The generated pulses are then transmitted on lines 123′ to the counting banks which they serve to uncount, thereby effecting positional control of the scanner head upon uncounting by generating pulses, or opening and closing circuits with the various servo devices or motors described.

The control of the conveying apparatus driving the reproduction apparatus to a selected information storage unit or magazine may be effected as follows: Each information storage unit or magazine is numerically classified. There will be, for example, ten rows of magazines stacked one above the other, each row having 100 individual magazines laterally adjacent to each other. The storage system is thus provided with 1,000 information storage units each of which contains a large number of individual frames or documents recordings. The magazines may also each contain motion picture film which is projectable as a motion picture remotely from the storage area.

If the magazines denoted 1 to 100 are located in a first row, 101 to 200 in a second row, etc., and it is desired to view the information found in a magazine, which in the drawing, is classified as number 350, the dial switch PrS′ is operated to generate such number as pulse trains. The first three pulses generated set up counter PrCMz which controls the movement of the mount for head 39′ in the vertical direction by controlling operation of the motor Mz to drive the arm 36 so that scanning head 39′ is positioned opposite the third row of magazines. The next number 50 which is dialed, presets counter PrCMx to count out with the receipt of 50 pulses from the switch 123 as the head 39′ moves from a home position past 50 magazines to a position where it is in alignment with the fiftieth magazine in the third vertical row. By providing suitable gear means, the limit switch 123 may be actuated with each rotation of the motor each time a pin on the output shaft of said motor engages said switch and the switch generates uncounting pulses which are fed to the respective counters and are an indication of the movement of the conveying apparatus. Upon receipt of the 50th pulse from the switch actuated by motor Mx, counter PrCMX uncounts and effects two control functions. These control functions result from operating control switches upon uncounting or by the generation and transmission of control pulses. For example, a pulse is generated and is transmitted to the stop control S of motor Mx, effecting the stoppage of said motor in a predetermined manner such that the apparatus is in alignment with the desired vertical row of magazines. A second pulse is also generated by counter PrCMX and applied to energize a control relay in the preset counter PrCMz which relay generates and transmits a pulse to the forward control F or motor Mz. Such vertical drive motor had previously been operated to position the column 36 mounting the scanning head at a high or low vertical position. Assuming that the column 36 mounting scanner 39′ is at the top of column 23, then motor Mz is operated to drive the carriage 35 down column 23 towards the selected magazine. Three pulses are generated by the limit switch 123-Mz operated by motor Mz and are applied to the counter PrCMz. Upon receipt of the third pulse indicating that head 39′ is aligned opposite the selected magazine classified by notation 350, counter PrCMz uncounts, and effects stoppage of motor Mz in a predetermined manner by energizing the stop control S of said motor. Control S of Mz is operative to effect braking of the motor Mz in a manner such that 39' will then be operatively located with respect to the selected magazine and may be further coupled to derive information therefrom by projection of the pick-up head into the magazine as described. A pulse transmitted from counter PrCMz upon uncounting is applied to activate a control F of a motor or solenoid My which advances the head 39' into engagement with the magazine as defined by one of the means shown in FIGS. 6 to 12.

FIG. 16 provides control means for the devices of FIGS. 9 to 14 for driving the record tape past the pick-up heads. The tape drive comprises a capstan drive wheel 108, driven by a motor MR-T and engaging the selected tape 68' against a stationary or spring loaded depressor wheel 96. Tape take-up is effected by operating motor MR-2 at a controlled speed. FIG. 17 also illustrates means for effecting tape frame selection control. Selection of the desired frame information may be effected by the dial-operated counter means of the type described. A dial-operated selection control is manually operated to effect the scanning of a selected frame of the recording medium or tape 68' of a selected magazine and the automatic reproduction and transmission of the signal recorded on the selected frame location to remote receiving apparatus at the monitor station, where the signal is further processed and converted to a visual image on a television video viewing screen. Further control of the movement of the tape 68' and the selection of other frame recordings thereof for reproduction is provided by manually actuated controls on the panel 148. Notations 119F and 119R refer to controls which are manually operative for effecting the reproduction of information from the frame immediately following the one just viewed by the observer. Controls 120F and 120R effect forward and reverse drive of the tape.

Notation 124' relates to relay actuated switching means for effecting control of the tape drive motors MR-1, MR-2 and MT which switching means are energized by pulses or control signals generated by the panel controls 119 and 120 or by pulses transmitted from the frame predetermining counter PrCF. The controller 124' also contains means for effecting speed control of the motor MR-2, which is utilized to effect the winding of the tape onto reel R2. It is necessary to maintain a constant tension on the tape 68' while it is being driven so that the reproduced signal will not be distorted and the tape will not stretch or break. The maintenance of constant tension may be accomplished by driving a generator GE connected to the shaft of motor MR-2 and using the medium of feedback to control the generator load to define a constant tension load. The feedback control components are contained in the control device 124'. As this type of feedback motor control is known to the art, it will not be described. A controller SC for the reel drive motor MR-2 contains both speed and on-off controls which are energized by relays energized by pulses generated by control device 124'. Device 124' is a relay actuated controller operative to receive signals from any of the control devices 119, 120 or counter PrCF and to channel such control pulses to controls for the motors MR-1, MR-2 and MT so as to effect controlled forward or reverse movement of the record tape. Where direct video scanning of images recorded on photographic film or printed tape is employed device 124' may comprise a terminal block operable to electrically connect PrCF or manual tape drive control 120 with the motor MR-2. Thus it will only be necessary to automatically position the selected frame of the tape in alignment with the scanning camera and only motors MR-1 and MR-2 need only be controlled without resort to complex tension or speed control. However, if the recording medium is magnetic tape, it is necessary to drive said tape at a predetermined and constant speed past the pick-up heads to reproduce selected picture signals which may be converted to still images on a video monitor.

The predetermining frame counter PrCF effects frame selection control by uncounting upon receiving-frame position indicating pulses reproduced by an auxiliary reproduction head PU' and recorded on a channel of the tape 68' other than the video picture signal recording channel. The frame signal pulses reproduced by head PU' are amplified in a reproduction amplifier PU'-RA and are fed to frame counter PrCF as the tape 68' moves. Upon arrival of the selected frame at head PU, the signal on the selected frame is reproduced by reproduction head PU, amplified in a reproduction amplifier PU-RA and passed to a video signal transmitter 122. Means for converting the video signal to an image is provided in greater detail in FIG. 17. Counter PrCF is preset by properly operating switch PrS'. When the reproduction head is located for reproducing signals from the tape 68', the starting control F of motor MT and the controls for motor MR-2 are activated by a limit switch 127' which is actuated by advancement of the scanning heads into operative position to initiate drive of the tape 68' past the reproduction heads. Upon uncounting, the counter PrCF activates the reproduction head PU to effect reproduction of the selected picture signal recorded on tape 68'. A pulse transmitted to transmitter 122 effects transmission of the selected video signal to the remote receiving apparatus. Another simultaneously generated control pulse effects control of the tape driving motors to stop the tape after the selected frame recording has passed the reproduction heads. The control 124' may contain means operative upon receipt of a pulse from counter PrCF for stopping motors MR-2 and MT and starting motor MR-1 to drive the tape in reverse to either rewind the tape onto reel R-1 or drive the tape a degree such that the frame immediately following the frame just reproduced from may be scanned next by operating frame selection control 119F.

It is noted that while it is required to move magnetic tape past the reproduction head for reproduction of the selected signal, employment of a video camera as the scanning means requires stoppage of the tape so that the selected image frame is aligned with the lens system of the video camera apparatus. These functions may be effected by suitably designing the frame selection control PrCF and the braking controls for motor MR-2 to effect stoppage of tape 68' with the selected frame thereof properly positioned with respect to the camera scanning system.

If photographic or motion picture film is utilized as the recording medium, then the frame signal pick-up head PU' may comprise a photoelectric cell operative to scan an edge of the tape 68 or filmstrip containing frame indicating marks for generating pulses which are transmitted to the frame counter PrCF to cause its uncounting to effect control as described.

Notations 119F, 119R, 120F and 120R refer to manually actuated switches and controls mounted on control panel 148 which are electrically connected through wires 118C and the overhead wiring system to control components 119'F, 119'R, 120'F and 120'R mounted on the conveying apparatus. The control 119F effects forward drive of the tape 68' a degree such that the frame following the one containing information just monitored will pass the pick up heads and the signal recorded will be automatically reproduced and transmitted to the monitoring apparatus which includes a video receiver 117, picture tube 116 and other picture storage apparatus to be described. Notation 119R refers to control means for effecting return drive of the tape 68' a degree such that the frames prior to the one being viewed may be reproduced and monitored on picture tube 116, by further manually operating control 119F. Notation 120F refers to a control for effecting the sustained drive of the tape 68' forwardly past the reproduction apparatus and notation 120 refers to a manual control for effecting the rearward movement of the tape. The control 119'F is energized by a panel mounted control 119F which is a sequential switching device which automatically recycles itself each time it is energized. Control 119F' contains a first relay energized by a pulse generated by 119F which effects the starting of motors MT and MR-2 to drive the tape so that the next frame passes the reproduction head or is located in alignment with the TV camera. Upon receipt of the frame indicating signal reproduced by head PU', a pulse is generated by control 119'F and applied to the stop controls for the tape drive motors which stops said motors. Control 119'R, when energized, operates to control the operation of motor MR-1 to reverse drive the tape a predetermined degree. Control switch 120F is operative to activate a control relay 120'F which generates a pulse to activate the start control of the motors MT and MR-2. When switch 120F is released by the operator, the relay 120'F generates a second pulse which is applied to the stop controls S of motors MT and MR-2. In a similar manner switch 120R and relay 120'R controlled thereby, effect the reverse drive of tape or film 68'.

Summarizing, the means illustrated in FIG. 15 for selectively controlling the apparatus, may be described as follows: The operator requires access to stored information, dials selection switch PrS' according to the code denoting a selected magazine to be searched for information and he operates the dial switch to effect driving of the selected tape therein to position a selected frame for scanning. The predetermining counters PrCMX, PrCMY and PrCF are thereby set up or preset and are operative to effect a desired control sequence by uncounting with the receipt of feedback pulses to effect positional control of the conveying apparatus by controlling the motors driving the conveying apparatus from a starting position defined by a stop such as stop ST preferably located at a home location on the X directional trackway. Such feedback signal pulses are generated by counting motor shaft rotations or by scanning means activated as the apparatus passes predetermined positions located throughout the storage area. When so preset, counter PrCMX generates a first pulse which is applied to the starting control F of motor MX and starts the motor. Upon uncounting, counter PrCMX generates a pulse which is applied to the stop control S of motor MX effecting its stoppage and simultaneously generates a pulse at the start control F of motor MZ. While counter PrCMX counts down, a second counter PrCMX may operate to totalize the pulses received by PrCMX and may be used to control the return travel of the conveying apparatus to its starting position or to constantly monitor and determine the position of the conveying apparatus relative to its starting position. Motor MZ then drives the carriage 25 from a first position ST' to the vertical location of the selected magazine at which location the counter PrCMZ counts out and sends a pulse to the stop control S of motor MZ and a second pulse to the starting control F of motor MY. Motor MY then operates to project the pick-up head 39' to an operative position with respect to or against the selected magazine housing so that the motors MR-1, MR-2 and MT are respectively coupled to their magazine driving fittings, the pick-up or scanning means is aligned with or against the tape and the motor MT is in position to effect driving the tape past the scanning apparatus. If counter PrCF is employed to locate a selected frame of the tape for scanning, then tape drive motor MT and MR-2 are automatically started by a pulse from the limit switch 127 which is actuated when it contacts the front wall of the selected magazine 42. Limit switch 127 thus operates to stop motor MY with the head and apparatus engaged against or aligned with the selected magazine and the tape drive means of the conveyor coupled to the magazine input shafts. Counter PrCF controls the drive of the tape as described and controls 119 and 120 may also be employed to effect further control of tape movement in the act of searching for information recorded on said tape. The tape may be automatically driven to its starting position by sustained closure of the panel switch 120R. When the observer has finished searching information recorded on the selected tape, he may effect return of the conveying apparatus to a starting position by actuating a switch 126, sending a pulse to a holding relay SY which bypasses switch 127 and reverses the motor or solenoid MY withdrawing scanner 39' from its coupling to the selected magazine 42. When scanner 39' moves to its retracted position, a limit switch 128 mounted thereon is actuated as it strikes a stop ST'' generating a control pulse on the stop control of motor MY and simultaneously generating a pulse on the reverse control of motor MZ which then drives the carriage 35 to its lowest position on the column 23 at which position a limit switch 129' becomess actuated as it strikes a stop ST'. Limit switch 129 pulses respectively the stop control S of motor MZ and the reverse control R of motor MX. Motor MX then drives the carriage 22 to its home position at one end of the track 21 where a limit switch mounted on carriage 22 strikes a stop ST and pulses the stop control S of motor MX stopping the conveying apparatus thereat.

FIG. 18 is a schematic diagram showing means for magnetically recording a signal onto a magnetic recording medium such as tape 68' wherein the signal is reproducible and capable of generating a still picture on a monitor screen. A video scanning device such as an iconoscope is provided to scan an image field and the picture signal derived therefrom including the synchronizing, blanking and equalizing signals associated with said picture signal are recorded on magnetic tape. Readout and the reproduction of the information defined by said signal in the form of a stationary image may be effected by one of a number of means employing storage devices such as video storage tubes or the like, or by repeatedly reproducing the video signal at a predetermined rate and synchronously applying it to the input of conventional television receiving and viewing apparatus. In the arrangement shown in FIG. 18, a video signal derived by the scanning beam of a television scanning iconoscope or camera tube and including the necessary synchronizing signals, is recorded on a selected length of a moving magnetic tape. The tape may be supported within one of the magazines associated with the systems described, thus the control system of FIG. 15 may be applied to the apparatus. The system shown in FIG. 18 may be utilized to add or record video information on record members stored as defined in FIGS. 1 to 5.

The controls and means for selecting a particular magazine as provided in FIG. 16 including the positioning controls PrCMX, PrCMZ, switches and other components may be applied to the control means referred to by notation CO. The means described for effecting control of the movement of the tape to selectively position and move a particular frame thereof are also assumed to be included within control block CO. a television camera 143 is provided in a housing 145 and focused to scan a surface 141′ containing a page 141 of printed matter such as a document so as to be scannable by the scanning means of said camera. In other words, the optical system of the camera is adjusted for optimumly scanning the surface of document 141. A light source LS is provided mounted within housing 145 and is operative to properly illuminate the surface 141′. The resulting composite picture signal derived by the scanning action of camera 143 is passed to a conventional television amplifying and transmitting apparatus 144 which transmits said video signal to receiving apparatus 147 which is mounted on the described conveying apparatus for the scanner.

Assuming that it is required to record a picture signal onto a selected length or frame of a selected magazine provided in the system of FIG. 1 for the purpose of updating a business record file, the operator selectively operates dial switch PrS′ to effect command control of the conveying apparatus to position the described recording heads RH, RH′ and the erase head EH in alignment with the selected tape of the selected magazine. Further control as described hereafter effects driving the selected tape so that the selected length thereof or frame will pass the recording and erase heads to effect transducing of the video picture signal thereon. The erasing action precedes the automatic recording of the composite video picture signal transmitted from TV camera output 144 onto the selected frame of the tape.

Notation 147 refers to a modified receiving apparatus, which is adapted to effect control of the generation of the desired composite video signal and its recording onto a selected length of tape 68′. A switch 149 is activated by a pulse from the positonal control computer CO to pass a reproduction of the video signal just recorded on the selected length of the tape 68′ to a recording device 150 which is operative to repeatedly reproduce said signal and apply it to control the picture generating electron beam of a television picture tube 116 to generate a sustained image for monitoring purposes. A reproduction head PU reproduces from the same tape channel engaged by the recording head RH and passes its output to a reproduction amplifier RA. A second reproduction head PU′ reproduces pulse signals recorded on tape 68′, which pulses are passed to an amplifier RA′ connected to a counting device as described and located in the frame locating computer CO. Upon uncounting, said counter generates a pulse which is transmitted to switch 149 and the signal is reproduced and passed to a recorder and signal repeater 150, to be described, which effects generation of a viewable picture on a television monitor screen.

The television camera 143 is positioned so as to effect video scanning of the surface of a document 141. The resulting picture signals are fed to a transmitter 144. The tape 68′ is moved relative to the recording head RH by motors MR-1 and MR-2 and a picture signal, utilizable by television receiving apparatus to generate an image of the information scanned by the scanning beam of camera 143, is generated and transmitted to recording head RH at the proper instant and recorded onto a predetermined length or frame of tape 68′. It is noted that record 68′ may comprise any magnetic recording member capable of having signals recorded thereon as described, and it is assumed that the drive means for member 68′ includes means for moving it at the proper speed with respect to the magnetic head RH for properly recording picture signals thereon. The signals recorded on tape 68′ represent single, video read-beam image field scans, that is, each is a signal derived from a complete read beam scan or sweep of the picture field scanned. One means for sustaining the image generated by a picture signal derived from scanning a single frame of information is to repeatedly generate said picture signal in a manner such that it modulates the picture generating beam of a television camera viewing screen 116 to sustain a still image thereon. This is accomplished by using a single repeating means denoted 150 which is shown in greater detail in FIGS. 22 and 23.

To effect full frame video picture signal recordings on tape 68′, the video signal generated by the scanning tube of camera 143 is passed to recording head RH through a switching device 147′ which is operative to pass a full frame composite video picture signal generated by camera 143 at the proper instant so that the signal will be recorded on the selected length of tape 68′.

Switches S and S′ are located on the control panel containing selection switch PrS respectively used to effect the recording of a single frame video picture signal onto 68′ or the reproduction of a selected frame thereon. The control computer 148 may comprise, as hereinbefore described, an array of relay banks arranged in counting decades and operative to uncount upon receiving the predetermined numbers of pulses from position indicating devices such as limit switches actuated by each turn of the shafts of motors Mx, My, etc., or generated by photoelectric scanners energized by motion of the conveying apparatus past position-indicating markers. Upon uncounting, one preset counter in control computer 148 may energize a relay which generates and transmits another pulse to another control starting a second motor and simultaneously switches the preset counter for controlling the second motor into circuit with the pulse generating switch to control operation of the second motor.

A device 147′ forming part of the receiver 147 comprises a precision electronic timer which is energized by a pulse from counter PrCF when it uncounts as the selected tape frame arrives at the recording transducer and effects the recording of a selected video picture signal onto the selected length of the tape 68'. Multi-circuit electronic timer 147' performs the functions of (a) energizing erase head EH for a period to effect magnetic erasure of signals from the selected frame of tape 68', (b) completing a circuit between receiver 147 and recording RH for one-thirtieth of a second for effecting the passing of a full frame video picture signal generated during a single scanning sweep of the read beam of television camera 143 to the recording head RH to record same on tape 68', (c) controlling movement of the tape 68' by controlling operation of the tape drive motors by energizing their forward, stop and reverse controls respectively denoted F, S and R.

The device 147' may comprise a repeat cycle timer energized by a control signal and operative to effect the proper recording of all signals on the selected frame location of tape 68'.

Timer 147', when it is operatively coupled to tape 68', effects the reproduction or recording of a single frame video signal generated by the scanning beam in television camera 143. The characteristics of the video signal may be utilized to control the reproduction or recording of a single frame signal. For example, the vertical frame synchronizing pulse is separated from the composite video picture signal. The frame vertical sync pulse, when separated from the rest of the signal, may be utilized to control recording of the frame video signal.

Recording control may be effected by employing a gate or electronic valve closed by a pulse formed of the clipped vertical sync pulse, which gate completes a circuit between recording head RH and the transmitter 144 of television camera 143 or activates a repeat cycle electronic timing and switching device (not shown) operative to control the single frame video picture signal generating and recording operation. The electronic gate is controlled to close and open for a predetermined period of time to effect the recording of a full frame video picture signal on the magnetic tape.

FIG. 19 shows means for recording a full frame video picture signal on a selected length of magnetic recording tape. A television receiver 147 receives and amplifiers signals generated by a television camera transmitter 144. Characteristics of the video signal are utilized to control recording of the full frame video signal on a selected area of magnetic tape 68'.

The apparatus of FIG. 19 utilizes conventional TV synchronizing pulses forming part of the composite television picture signal to control recording of said signal. Specifically, the vertical synchronizing pulses inherent in the composite television picture signal are separated therefrom and are used to effect recording control.

A first video detection circuit 147'A is connected through a switch 147'B to a conventional sync clipper and a low pass filter denoted 147'C. The sync clipper may be a fundamental diode or triode clipper in circuit with a low pass filter which serves to separate the frame vertical sync pulses from the video signal.

The switch 147'B may be an electronic switch which is operated by an energizing pulse generated by predetermining counter PrCF when it uncounts as the selected section of tape 68' arrives at the recording head RH. As set forth above, counter PrCF receives reproduced frame indicating signals recorded at spaced intervals on tape 68' from reproduction head PU'. When counter PrCF uncounts, it pulses switch 147'B closing same and passing the video signal from detection circuit 147'A to clipper-filter circuit 147'C. The first clipped vertical sync signal to pass through switch 147'B is clipped from the video signal by circuit 147'C and amplified in a pulse amplifier 147'D. The amplified pulse is generated as two pulses by means of a pulse divider or pulse transformer in circuit 147'D which is operative to effect erasure control to erase noise or recordings from that frame of the tape 68' onto which the new video recording is to be recorded.

One of the simultaneously generated pulses is applied to electronic switch 147'E having a predetermined time delay, to control erase head EH to erase just that part of tape 68' on which the new recording is to be recorded.

To effect automatic erasure, a power supply PS is connected through switch 147'E to erase head EH. Switch 147'E has a built-in time delay to delay its opening and deenergize erase head EH when the selected length of tape 68' has passed erase head EH.

The circuitry of FIG. 19 is operative to control the gating of the video signal to a selected section of the surface of tape 68' so that at least a full frame video picture signal will be recorded. The apparatus of FIG. 19 operates to record the first complete video signal that is generated on the amplifier 144 of the TV camera 143 after the selected frame of tape 68' has reached the recording head. The electronic switch indicated by notation 147'g may comprise a magnetron beam switching tube or a cyclophon tube which are capable of effecting switching in the megacycles range. A time delay is incorporated in switch 147'G which is long enough to delay the closing of the switching device until the appearance thereat of the equalizing pulse associated with the next full frame composite video picture signal. A conventional high speed electronic timer provided in gate 147'G may be used to gate the video signal passing through gate 147'G after a predetermined time interval passing a complete full frame video picture signal. Another means for effecting passage of the full frame video signal immediately following the reproduction of the next vertical sync pulse is to generate equalizing pulses on the desired full frame video signal immediately after switch 147'B is closed. The vertical sync pulse is also passed to pulse recording head RH' which effects its recording onto a selected location of the tape to serve as a frame locating recording.

Details of the switch device referred to by the notation 147'G of FIG. 19 are shown in FIG. 19'. A pulse, generated either when counter PrCF uncounts or by switch 121, is transmitted to a pulse activated switch 147'-G1 which closes and passes the incoming video signal from receiver 147 to the cathode of a beam switching tube 147'-G2. The switch 147'-G2 may comprise a magnetron beam switching tube having a single centrally located cathode CA and multiple peripheral anodes or targets T. A typical tube of this type is the Haydu MO-10. A complete frame signal may be passed to the recording head RH by generating the incoming video signal on a first target of the switching tube which is connected to the recording apparatus. When the frame signal is completely generated, the beam is switched out of circuit with the video recording head RH.

The components of a magnetron beam switching tube are (a) spades S1, S2, S3, etc. operative to automatically form and lock the beam, (b) target output plates T1, T2, T3, etc. and (c) switching grids G1, G2, G3, etc., which will switch at high speeds. Lowering the potential of the grid of the position at which the beam is formed will effect the advancement of the beam to the next position.

The beam may be initially formed across position 1 by sufficiently lowering the potential of the spade S-1, which action is accomplished by means of switching device 147'-G1 which, when activated, is operative to lower the potential of the spade S1 sufficient to form the beam across position 1 to target T1.

Advancing the beam to the next tube position at which it is passed to the recording head RH may be accomplished by lowering the potential of the switching grid G2 which is accomplished by a short negative pulse transmitted to said spade. The vertical sync pulses are clipped and separated from the composite video signal by a sync clipper and low pass filter 147'-C and is applied to effect video signal readout by employing the amplified vertical sync signal to lower the potential of grid G2 and effect switching of the beam and read out. The vertical sync pulse is passed to amplifier 147'D and then to a timer and signal generator 147'G4, which is connected to grid G2, effects the switching of the signal to target T2 from which it is passed to the recording head RH. The beam is then advanced to position 3 by sufficiently lowering the potential of grid G3, a function which may be accomplished by passing the next clipped pulse to grid G-3 through 147'-G4 and lowering the potential of the grid a delay period after the receipt of the first clipped pulse from amplifier 147'D. Signal generator 147'-G4 is thus a timer-controller operative to first pass a pulse to grid G2 upon receipt of a pulse from amplifier 147'D and after a delay equal to the time it takes to pass the complete video frame signal to generate a negative pulse which is passes to grid G3 to effect the advancing of the beam to position 3.

If a conventional television signal is utilized, control 147'G4 may comprise a precision electronic timer and pulse generator which becomes activated upon receipt of the first clipped verticle sync pulse received from 147'D and generates a negative pulse on switching grid G2 a delay permitting the frame video signal to pass through the beam switching tube in its entirety. The timing device in 147'G4 is operative to generate a second pulse which is transmitted to switching grid G3 a delay after the generation of the first pulse to G2 which is such that the entire video frame signal is passed to recording head RH.

FIG. 20 shows another means for magnetically recording a full frame video picture signal on a moving magnetic recording medium such as the herein described magnetic tape which involves generating on separate lines a picture and blanking signal, a vertical sync signal and a horizontal sync signal and recording each in their time synchronized relationship on a separate channel of the tape 68'.

The apparatus of FIG. 20 includes a sweep and blanking unit SB and a camera unit 143 which is focused to scan the printed material or document 141' of FIG. 18. The operation of such a camera unit is known in the art of closed circuit television. It will therefore not be described in detail. The three separate signals are transmitted on three lines to respective recording heads RH, RH-1 and RH-2 to be recorded thereby on adjacent channels of tape 68'. Readout and recording synchronization is effected by employing the first clipped vertical sync pulse which is generated after the arrival of the selected tape frame length at said recording heads. Such vertical sync pulse is used to effect the generation of the full frame video picture signal on the recording heads by closing respective electronic switches and passing the video signals defining the next full frame video signal to their respective recording heads. The vertical frame signal is passed to a pulse generator PAM which, after receiving the pulse from counter PrCF and the vertical sync pulse, generates pulse signals on five separate circuits to effect the passage and recording of signals defining a complete video signal the separate components of which are recorded by the separate recording heads RH, RH-1, RH-2 and RH-3.

Pulse generator PAM preferably includes an electronic switch activated by a pulse from frame counter PrCF and operative, when so actuated, to pass the next vertical sync signal from the vertical sync amplifier V.S.A. to pulse generator PAM. The vertical sync signal is then amplified and inverted, if necessary, in generator PAM, which includes a pulse transformer which generates said vertical sync pulse on four circuits to effect the recording of the full frame signals following the uncounting of counter PrCF.

The beam switching tubes MBS-1 and MBS-2 are utilized to gate the picture and blanking signals and the horizontal sync signals to the recording heads RH and RH-1 respectively. The pulse recorded by head RH-2 is used as the frame vertical sync signal when the frame signals are later reproduced. The pulse recorded by head RH-3 may be a frame indicating pulse used to uncount counter PrCF, a function which may also be accomplished by position or frame indicating pulses which are prerecorded on tape 68', or by reproducing the vertical sync signals recorded by head RH-2.

The recorded signal may be immediately monitored by means of reproduction head PU, PU-1 and PU-2 which are adapted to simultaneously reproduce the described signals just after they are recorded and pass them to a recorder and signal repeating device SSR. Device SSR is adapted to repeatedly reproduce and generate said signals repeatedly on the input of an image-generating picture tube 116, the write beam of which is modulated by the repeatedly generated signals to generate a still image on its screen. Signal repeater SSR may comprise an electrostatic storage tube and a read beam operative to repeatedly scan the storage element of the storage tube and repeatedly generate the same signal reproduced therefrom. The video signals may also be recorded on a drum rotating at constant speed past a reproduction head.

FIG. 21 shows a control circuit which is a modified form of that shown in FIG. 18 for effecting the recording of a single frame video picture signal onto a predetermined section of an elongated magnetic recording member such as the hereinbefore described magnetic tape 68'. The means illustrated is operative to first record the single frame video picture signal in a storage device and, then when a predetermined length of driven magnetic tape is in alignment with a magnetic recording head, reproduce the stored or recorded video signal and pass it to said recording head to record it onto the selected section of the moving recording member.

In the drawing, video camera 143 is positioned and adjusted to scan the illuminated surface of a page of printed matter or document 141 and operative to generate a composite picture signal thereof with the necessary sync signals inserted therein by the sweep and blanking unit of the camera which transmits the signal when the operator manually closes a switch SW-1, to a signal storage unit 150 similar to device SSR of FIG. 20. The storage unit 150 includes a signal repeating means such as a rotating magnetic recording drum and pick-up head, the output of which is connected to the tape recording head RH. The device 150 may comprise any suitable signal storage device such as a storage tube with read-beam readout means, as defined elsewhere herein, for effecting the reproduction of the stored video signal and its transmission to the recording head RH. Notation 150 SW refers to a switch which is part of the controls of signal storage unit 150 which switch is activated by a pulse from counter PrCF of control 121 to effect the reproduction of the video signal stored in unit 150 and its application to modulate recording head RH. If a storage tube is employed as the storage means of unit 150, the activation of switch 150SW is operative to effect the completion of a circuit between unit 150 and recording head RH and to trigger operation of the read beam thereof to effect generation of a video picture signal which is passed to recording amplifier RA and recorded on the tape by recording head RH.

FIG. 22 shows further details of the signal storage and repeating device 150 of FIG. 17 together with typical input and read-out means. A number of means are hereinafter presented for converting a signal of a single frame video picture signal generated by the scanning electron beam of a television camera to a still picture on the face of a television tube or screen. FIG. 22 provides means for recording a complete single frame composite video picture signal, including the necessary synchronizing and blanking signals, on the recording surface of a rotating disc or drum 151 which is rotating at a speed defining signal reproduction rate equivalent to normal video picture tube playback scanning rate. The circumference of the drum 151 is thus provided such that the beginning and end of such full frame video picture signals will fall substantially adjacent to each other. While FIG. 22 shows apparatus for reproducing a still picture from a composite video signal, the three channel system of FIG. 20 may be employed by providing additional reproduction and recording heads in the circuit illustrated for reproducing such multiple signals in the signal storage and repeating apparatus 150 of FIG. 22.

Three reproduction heads PU, PU′ and PU″ are provided in the system of FIG. 22 which are mounted adjacent to each other and positioned laterally across the tape 68′. Reproduction amplifiers RA, RA′ and RA″ are adapted to amplify and transmit signals reproduced by said respective heads. The speed of the tape 68′ is controlled by conventional means such that the video signal reproduced by pick-up PU will be recorded as described on the surface of drum 151 in its entirety during one rotation of said drum. The motor 206 driving the drum 151 is preferably a synchronous motor or any motor which may be speed controlled to effect the desired end results. The motor MT driving the capstan wheel 108 which engages and drives the tape 68′, is preferably a controllable electric motor capable of driving said tape at such a speed that the signal recorded thereon will be reproduced from the tape and recorded on the drum 151 during a complete revolution thereof. The video signal is reproduced from the recording surface 151′ of the drum each time the drum rotates and it is transmitted to a video receiver 117 having a picture tube 116 with a picture generating beam modulated thereby to generate a still picture. It is noted that the control of the motors 206 and MRT may be effected when the desired frame of the tape is at or near the reproduction heads PU by driving separate generators off the shaft of each motor, feeding the resulting signals to a balancing bridge or other error sensing element and utilizing the difference or error to correct the speed of one of the motors. Still another means for synchronizing the speed of the tape 68′ to the rotational speed of the drum 151 is to drive both with a single driven shaft.

Selection of one of the different video signals recorded on tape 68′ and using same to generate a still picture from one of the recordings may be accomplished as described by dial or push button switch control of the apparatus illustrated. The dial switch PrS′ may be used to preset the frame counter PrCF which controls automatic read out of the selected frame recording. Operating push button switch 121 will energize the sequencial switching device 121′ which will control the drive motors MT and MR-2 and necessary switching means to effect the reproduction of the selected signal recorded on the tape which immediately follows the signal just monitored. Control 121′ is an automatically resetting sequencial timer operative to initiate driving of the tape 68′ at a constant speed. When control 121′ receives a frame indicating pulse generated by pick-up PU′, a control timer therein becomes operative to effect reverse drive of tape 68′ after the entire selected video signal has been reproduced therefrom. The timer operates to stop motor MR-2, start motor MR-1 and control motor MT to be driven in reverse. Thereafter, control 121′ effects the stopping of motors MR-1 and MT in a manner to permit the attainment of tape movement at constant speed for the reproduction of the video signal recorded on the frame following the one just reproduced from when control 121 is next activated. Circuits thus extend from controls 121′ and PrCF to motors MR-1, MR-2 and MT which are controlled thereby.

In FIG. 22, by operating dial switch PrS′ frame counter PrCF is preset and the control means thereof activates the starting controls for motors MT and MRT. The tape is then driven past the heads PU, PU′ and PU″ at constant speed. It is assumed that the operator previously actuated a switch on the panel PrS which pulsed the starting control S′ of motor 206 causing said motor to drive drum 151 at a constant speed. Erasure of any prior signals from the recording surface 151′ may be effected by actuating a switch SWC on panel PrS which energizes an electromagnetic solenoid 150′C urging an erasing head EH-2 close enough to the surface of 151′ and for a sufficient time interval to erase all prior signals therefrom. Frame indicating pulse reproduced by head PU′ are transmitted to and effect uncounting of frame counter PrCF causing said counter to uncount upon arrival of the selected frame at head PU. Upon uncounting, counter PrCF is adapted to transmit a signal pulse to a first switching device 150′B which is an electronic relay which passes the reproduction of the next frame indicating pulse to an electron switch 150'B which is activated thereby to pass the selectively reproduced video signal from recording amplifier RA to a recording head RH-2 which records said signal on the recording surface 151' of drum 151. Details of the switching device 150'A are illustrated in FIG. 24 wherein a beam switching tube is utilized to effect gating of the selected video signal. Notation 150'C is an electronic switch operative to close and remain closed for a time interval equivalent to the time it takes for the entire video signal to pass therethrough. Notation CAM refers to a camera positioned to photograph the image produced on the monitor screen. Operation of camera CAM may be effected by manually actuating a switch located on the control panel PrS or may be effected automatically with the uncounting of counter PrCF.

Notation LC refers to a motor or solenoid for controlling the shutter of camera CAM to effect the taking of said picture of the image generated on the screen of image tube 116. Such operation may be effected by the pulse generated frame counter PrCF' or timer 121' or by operating manual switches located on control panel PrS.

FIG. 23 illustrates the use of a storage tube applied to the apparatus of FIG. 22 as a substitute for magnetic recording drum 151. The tape from signal generated when counter PrCF uncounts is derived from the reproduction amplifier RAPU and is applied to the beam switching device 150'B which is operative to pass the selected video signal to a recording storage tube denoted 150' which records the information as a charge pattern on a dielectric surface thereof. The image pattern generated on the storage element of the tube remains for the operational decay period of the dielectric of the tube and is scanned by a read-beam to generate the video signal. The read beam is modulated by the stored charge pattern generating a video picture signal which is transmitted to a receiving apparatus 117 which signal modulates the beam of a conventional television picture tube 116 to generate an image thereof capable of being visually monitored. Features included in FIG. 23 comprise manual switching controls on the control panel PrS for switching the storage tube 150' on and off, and a push button switch SF adapted to effect erasure of the charge on the storage tube 150'. It is assumed that the associated electronic components for effecting recording of the selected video signal and the repeated reproduction thereof are included in the block denoted 150' in addition to the on, off and erase controls EC.

FIG. 24 is a schematic diagram showing details of the reproduction device 150'A of FIG. 22 and such details are also applicable to the apparatus of FIG. 23' for effecting recording of a selected video signal on the storage device 150. A beam switching tube is employed to effect selective and synchronized readout of the signal reproduced by head PU and its transmission to the reproduction amplifier RA. Operation is initiated when either frame counter PrCF counts out or switch 121 is activated either of which operations generates two energizing signals, one of which activates a power generator 150'A3 which is operative to lower the potential of spade S1 sufficiently to effect the formation of the beam transmitted from reproduction amplifier RA across cathode CA to target T1 and the other of said signals to a switching relay 150'A1 which immediately breaks the circuit between RA'' and a timer 150'A2. The timer 150'A2 is adapted, upon receipt of the first sync pulse reproduced by head PU'', to emit a first negative pulse over a circuit to switching grid SG2 whereupon the signal is passed to the recording head RH2 and is recorded either in a storage tube 151' or onto the surface of signal repeater 151 of FIG. 22. Timer 150'A2 is adapted to emit a second negative pulse over a second circuit to grid G3 after a time interval of one-thirtieth of a second or the time it takes for a signal defining a complete video frame to pass said switch so as to effect switching of the beam to target T3 whereafter it is either automatically returned to target T1 or is cut off. The sync pulses recorded on the channel of tape 68' scanned by the head PU'' are thus positioned to effect such synchronized readout. The location of the pulse reproduced by head PU'' will depend on the response of relay 150'A1 and the characteristics of counter PrCF.

FIGS. 25 to 28 illustrate a card reading apparatus coming within the purview of the instant invention and applicable as a replacement for the tape reading and recording apparatus of FIG. 11 thereby providing an information storage and reproduction system containing recorded information which is rapidly obtainable from storage by known methods of card selection and sorting. FIGS. 29 and 30 show a magnetic record card having a magnetic recording thereon, which card is readable by the apparatus of FIGS. 25 to 28 which also show a transducing device used for magnetically recording signals such as video picture signals relative to the card. The device of FIGS. 25 to 28 contains a pick-up head which may be similarly connected and serve the same functions as the pick-up head PU 2 of FIG. 22. In FIGS. 25 to 28 notation 236 refers to a magnetic reproducing and/or recording head and notation EH to an erase head both of which are fixedly positioned within a housing 237.

The record card shown in FIGS. 29 and 30 comprises an oblong sheet 246 of stiff cardboard having conventional punched holes 248 along an edge thereof and holes 248' in the face of the card which are used for automatic sorting purposes. An area 247 does not contain punchings or cutouts, on which area is disposed a layer of a magnetic recording material 247' such as a magnetic oxide which is preferably coated with a plastic sheet or coating thereover for protection.

The card 246, after it is automatically obtained from a file of similar cards by conventional card sorting means, is inserted into the transducing device of FIGS. 25 to 28 and driven therein past transducers to effect reproduction or recording operations relative to the magnetic recording material thereof. FIG. 28 shows the device capable of receiving a card 246 inserted into a slotted opening 231 in one end wall 230 of the box-like housing 227. A drive mechanism within the housing 227 moves the card through the housing to a second opening 231' in the other end of the housing out of which opening the card is driven after it passes pick-up transducers therein. The transducers are shown in FIGS. 25 to 27 as positioned to scan a card driven through the housing. Two drive rolls 232 and 233 are rotationally supported by the side walls 227' and 227'' of the housing by engaging card 246 against respective free wheeling rollers 232' and 233' which are rotationally mounted on base 228. The rolls 232 and 233 are adjustable with respect to the rollers 232' and 233' to account for wear, and variations in the thickness of the card 246. They are each power rotated by respective motors 244 and 245 shown on wall 227' through respective bevel gears 78, 79, 78' and 79'.

The motors 244 and 245 drive the shafts of the rollers 232 and 233 at the same speed. Two guide rollers 242 and 243 are mounted on free-wheeling shafts which are supported in bearing by the respective sidewalls 227' and 227'' of the housing and are positioned a distance above bottom wall 228 to guide the card 246 as it passes under the head 236. The magnetic head 236 is held in a housing 237 having a finely threaded shank mount 238 which, by the use of adjusting nuts 239 and 240, may be adjusted in distance off the upper surface of 228. The side walls 227' and 227'' laterally guide the card in its travel through the housing 227.

Notation 234 refers to a limit switch having an actuator arm 234' which projects just above wall 228 and is operative to activate the controls of motors 244 and 245 to rotate drums 232 and 233 when a card is inserted into slot 231. A second switch 235 has an arm 235' projecting above wall 228 and is operative to stop the motors or a time dealy device may be used to properly stop said motors. Switch 234 may also be operative to start the motor 206 driving the drum 151 of FIG. 22 when actuated by the insertion of a card and to also effect the energizing of the magnetic erasing head EH of FIG. 22 for at least one rotation of said drum prior to the recording of the video signal derived from the record card recording area 247 onto the recording surface of drum 151. Notation 241 refers to wires for conducting the signals reproduced by head 236 to the recording head RH2 of FIG. 22.

FIGS. 31 to 33 show a modified form of the tape cartridge and transducing apparatus hereinabove described which is particularly applicable to the tape transducing arrangements shown in FIGS. 1 to 5 having signals recorded on magnetic tape disposed in housings which are arrayed side-by-side or in a circular array on a stationary or movable rack. The apparatus 300 comprises a plurality of tape containing cartridges, one of which denoted 302 is shown supported on a rack 301 which may be stationary as shown in FIGS. 1 to 3, rotatable about an axis as shown in FIGS. 4 and 5 or capable of being driven along one or two axes past a mount 316 supporting one or more transducers, drive means for the tape 68' and reels. Also supported on the mount 316 is an actuating device for opening and closing a door or shutter to expose and close off an opening of the type hereinbefore described to permit access to the tape by the transducer or transducers and, in certain arrangements, a power driven capstan wheel is projectable through said opening with the transducer.

The sidewalls of the cartridge 302 provide bearing support for the shafts 306 and 308 of the supply reel 305 and take-up reel 307 for the magnetic tape 68'. As hereinbefore set forth, the tape 68' is guided in a predetermined path between reels by a plurality of idler rollers 310 near supply reel 305 and rollers 311 near take-up reel 307. A depressor wheel 312 is rotatably supported behind the tape 68' to cooperate with a drive wheel 324 which together with its drive motor 323 is positioned with the end of the transducer 321 against the tape when the opening 304 in the end wall in the cartridge wall 303, is exposed after the shutter or door 314 is opened. The shutter 314 is shown as a rigid plate or flat elongated bar having a lower portion which slidably engages the front face 303' of the end wall 303 of the cartridge housing 302 and is held thereagainst by a bracket 313 secured to and extending across the front face 303' of wall 303. The bracket 313 contains overhanging edge portions 314'' running along and slidably engaging the outer surface of the portion 314' of the shutter to slidably seal said shutter against the front face 303' to cover the opening 304 when the cartridge is not in use and to prevent dust from entering same. Sealing means, not shown, may also extend from the end of the housing 316' of the mount 316 as provided in FIG. 13 to retain the interior of the cartridge sealed against atmospheric dust when coupling is effected during a transducing operation. The seal may comprise a flexible flange surrounding the magnetic transducer head 321 and the drive wheel 324 and is adapted to compressively engage the portion of the end wall 303 surrounding the opening 304 when the mount and cartridge are in operative relationship as shown.

The upper portion of the shutter 314 is angulated outwardly from the face 303' of wall 303 and contains a hole 315 therethrough, though which hole the end of an elongated pin 326, which is secured to the shaft of a rotary solenoid, is driven or positioned when the cartridge and mount 316 are operatively aligned as described and shown in FIG. 31. The rotary solenoid 325 is bistable in operation and is shown supported at the end of mount 316 above the solenoid 319 supporting the transducer 321. Said solenoid 325 is remote controlled to rotate pin 326 clockwise as shown in FIG. 33 to lift the shutter 314 so that the lower end thereof slides upwardly and clears opening 304 to permit the transducer head 321 or heads and the tape drive wheel 324 to pass through the opening and engage the tape in the cartridge as described. Upon the completion of a transducing operation and the return of the tape to the supply reel or a home location by the controlled operation of the motor (not shown) supported in mount 316, which drives the shaft coupled to the hub of the supply reel of the cartridge, the rotary solenoid 325 is energized and automatically controlled to rotate pin 326 in a counterclockwise direction to the position shown in FIG. 31 to close the shutter 314 over the opening 304. Thereafter the mount 316 or cartridge mount 301 is moved to disengage the end of the pin 326 from the shutter and the means described driving the reels and tape are disengaged from their respective coupling devices or cooperating means.

A number of additional variations in the structure and operation of information storage and reproduction apparatus of the type described are hereinafter noted as follows:

I. While reel-to-reel tape cartridges have been illustrated in the drawings, the system may employ endless tape cartriges as provided in parent application Ser. No. 515,417 wherein a single drive wheel is supported adjacent the magnetic pickup head and engages a portion of the tape against a depressor wheel supported within the cartridge.

II. Cartridges containing tapes driven between reels rotatably supported within the cartridge housing to rotate on a common axis may also be employed wherein each reel is driven selectively by respective coupling means supported by the magnetic transducer platform or mount and engaging either the hubs of each reel on opposite sides of the cartridge housing or respective reel flanges from the front of the housing as shown in FIGS. 9 and 14.

III. Mechanical arrangements may be provided whereby individual cartridges of tape are selectively transported or moved from the rack to engage the transducer means and the means described for causing movement of the tape past said transducer means, when alignment is effected between a selected cartridge and the transducer.

IV. The rack of cartridges may also be moved to engage the selected cartridge with the described transducer and tape drive means upon selectively aligning a selected cartridge and the transducer by movement of either the rack and/or the transducer mount.

V. Means may be provided which is supported adjacent the transducer on the same mount which supports the transducer mount for engaging the free length of tape between supply and take-up reels, for engaging and pulling a loop of the tape out of the selected cartridge housing and disposing same against the transducer or a support for the transducer in order to effect a transducing operation. The operation of such means is effected by automatically controlling a motor or solenoid when a selected cartridge is aligned with the transducer.

VI. It is noted that design structures of certain of the hereinbefore described arrangements may be interchanged with each other to effect variations in the apparatus described. For example, the means for opening and closing a shutter or door disposed adjacent an opening or window in a wall of the cartridge shown in FIGS. 31 to 33 may be applied to provide protection of microfilm disposed in cartridges in arrangements of the types shown in FIGS. 6 to 8 and 9 to 11.

I claim:

1. A remotely controlled scanning apparatus comprising in combination:

a television camera operable to scan a field aligned with the optical system of said camera, support means for supporting said television camera, means for movably mounting said television camera on said support means, motor means for driving said television camera in a plurality of directions on said support means, means for operating said television camera to cause it to scan the field aligned therewith and to generate video picture signals which are representative of the optical phenomena scanned by said camera, a monitor station having a video receiver and a video display means modulatable by the signals received from said television camera for generating visual presentations of the fields scanned by said television camera, means for communicating the output of said television camera to said video receiver, first control means for operating said motor means to effect the movement of said television camera in a first direction on said support means, second control means for said motor means operable to effect the movement of said television camera in a second direction on said support means, master control means for activating said first and second control means and means for operating said master control means to cause said motor means to drive said camera in a selected of said first and second directions, said master control means being operable when said television camera is predeterminately positioned after moving in said selected direction for stopping the movement of said camera to permit said camera to scan along a selected axis defining a predetermined image field and to generate picture signals of the phenomena within said predetermined image field.

2. A scanning apparatus in accordance with claim 1 wherein said master control means is operable in response to feedback signals which are generated with increments of movement of said camera as it is driven in a selected of said first and second directions and means operable to receive said feedback signals and selectively position said camera after moving a predetermined degree in a selected direction.

3. A scanning apparatus in accordance with claim 1 wherein said means for stopping said camera when predeterminately positioned comprises:

means for generating feedback pulses indicative of the degree of movement of said camera as it is driven in a selected direction, predetermining counter means operable to receive said feedback pulses, switching means controlled by said predetermining counter means and operable when activated thereby for controlling said motor means to stop movement of said camera when the number of pulses received by said counter means is indicative that the camera is positioned to scan said predetermined image field.

4. A scanning apparatus in accordance with claim 1 including a power operated device supported adjacent said television camera and movable therewith when said camera is driven on said support means, said master control means being operable for controlling operation of said power operated device.

5. A scanning apparatus in accordance with claim 1 including a plurality of information record units each containing information scannable by said camera, said record units being disposed at different locations and accessible to said support means for said television camera whereby the camera may be made to scan the information contained by selected of said record units, said means for stopping movement of said television camera being variably controllable to stop said camera when it is in alignment with a selected of said record units and means for effecting relative movement between the information contained by a selected record unit and said camera when the camera is selectively positioned to scan said selected record unit to permit the camera to scan all of the information contained by said selected record unit.

6. A scanning apparatus in accordance with claim 1 wherein said support means includes a trackway and a carriage adapted to be driven by said motor means along said trackway, means for movably supporting said camera on said carriage, said motor means comprising first power operated means for driving said carriage along said trackway and second power operated means for driving said camera with respect to said carriage, said first and second control means being operable to control operation of said first and second power means to predeterminately locate said carriage on said trackway and to selectively position said camera in attitude on said carriage to permit said camera to scan different fields when said carriage is selectively stopped on said trackway.

7. A scanning apparatus in accordance with claim 6 wherein said means for movably supporting said camera on said carriage comprises a vertically extending fixture and said second power operated means is operable to move said camera in a vertical direction on said fixture.

8. A video scanning apparatus comprising in combination:

A substantially horizontal trackway,
a carriage adapted for travel along said trackway,
a video camera,
a support for movably supporting said video camera on said carriage,
first power means for driving said video camera in a plurality of directions on said support to permit said camera to scan along different paths,
second power means for power driving said carriage along said trackway,
first control means for said first power means,
second control means for said second power means,
a remote monitor station including receiving means for the signals generated by said camera,
master control means located at said remote monitor station for predeterminately controlling the operation of said first and second control means so as to effect control of the movement and positioning of said carriage along said trackway and the movement of said video camera on said support whereby the camera may be predeterminately varied in location with respect to said carriage and may be selectively moved along said trackway for scanning different areas within the realm defined by said trackway and said support mounted on said carriage.

9. In a remote control television scanning apparatus, the combination comprising:

first means including a video camera for scanning image fields,
second means for movably supporting said first means,
third means for driving said first means on said second means and variably changing the scanning axis of said video camera,
a monitor station including a video receiver and visual display means for the video information generated by said video camera,
means for establishing a communication link between said first means and said video receiver,
a video recorder having a recod member and means for recording the picture signals generated by said video camera on said record member,
a recording input to said video recorder,
means connecting the recording input for said video recorder with said video receiver whereby the video signals received by said receiver may be recorded,
first control means operable from said monitor station for controlling the operation of said third means to move said video camera and predeterminately change the scanning axis of said video camera,
second control means at said monitor station for controlling operation of said video recorder to record selected video signals generated by said video camera, and
third control means for generating marker signals and selectively recording said marker signals on selected portions of said record member to permit the selective reproduction of said video signals from said record member.

10. In a remote control television scanning apparatus, the combination comprising:

first means including a video camera for scanning image fields,
means for controlling said video camera to generate full-frame video picture signals,
second means for movably supporting said video camera,
third means for driving said video camera on said second means and variably changing the scanning axis of said video camera,
a monitor station including a video receiver and visual display means for the video information generated by said camera,
means for establishing a communication link between said first means and said video receiver,
a video recorder operable to record the output of said video camera,
a recording input to said video recorder,
means connecting the recording input for said video recorder with said video receiver whereby the video signals received by said receiver may be recorded,
first control means operable from said monitor station for controlling the operation of said third means to move said video camera and to predeterminately change the scanning axis of said camera,
means for selectively coding the full-frame video picture signals recorded on said record member by said video recorder to permit the selective reproduction of said full-frame video signals from said recorder.

* * * * *